United States Patent
Brailovskiy

(10) Patent No.: US 11,968,412 B1
(45) Date of Patent: *Apr. 23, 2024

(54) BANDWIDTH ESTIMATION FOR VIDEO STREAMS

(71) Applicant: Amazon Technologies, Inc., Seattle, WA (US)

(72) Inventor: Ilya Brailovskiy, Los Gatos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/751,075

(22) Filed: May 23, 2022

Related U.S. Application Data

(63) Continuation of application No. 16/519,626, filed on Jul. 23, 2019, now Pat. No. 11,343,551.

(51) Int. Cl.
*H04N 21/6437* (2011.01)
*G06V 20/52* (2022.01)
(Continued)

(52) U.S. Cl.
CPC ......... *H04N 21/2402* (2013.01); *H04L 65/65* (2022.05); *H04N 21/23805* (2013.01);
(Continued)

(58) Field of Classification Search
CPC ......... H04N 21/2402; H04N 21/23805; H04N 21/2385; H04N 21/44209; H04N 21/6437;
(Continued)

(56) References Cited

U.S. PATENT DOCUMENTS

| 4,764,953 A | 8/1988 | Chern et al. |
| 5,115,309 A | 5/1992 | Hang |

(Continued)

FOREIGN PATENT DOCUMENTS

| CN | 2585521 | 11/2003 |
| CN | 2792061 | 6/2006 |

(Continued)

OTHER PUBLICATIONS

GB 2540204, Rate control of streaming modules sharing a communication channel to Taquet (Year: 2019).
(Continued)

*Primary Examiner* — Nathan J Flynn
*Assistant Examiner* — Caroline Somera
(74) *Attorney, Agent, or Firm* — Lee & Hayes P.C.

(57) ABSTRACT

Methods and systems for improved quality of a streaming session using multiple simultaneous streams. For the multiple simultaneous streams an audio/video device (A/V device) records and generates a high-resolution stream and a low-resolution stream for simultaneous transmission to a server. The server selects one of the two streams for retransmission to a destination client device. The server also monitors the streaming session and estimates a total available bandwidth between the server and the A/V device and assigns a confidence value to the bandwidth estimation. The server periodically transmits the bandwidth estimate and confidence value to the A/V device to improve the efficiency of the streams being generated by the A/V device. The A/V device can use the received bandwidth estimate and confidence value to adapt the resolution of each of the streams to efficiently use the total available bandwidth between the A/V device and the server.

20 Claims, 13 Drawing Sheets

(51) Int. Cl.
  *H04L 65/65* (2022.01)
  *H04N 21/238* (2011.01)
  *H04N 21/2385* (2011.01)
  *H04N 21/24* (2011.01)
  *H04N 21/442* (2011.01)
  *G06V 20/00* (2022.01)
  *G06V 20/40* (2022.01)
  *H04N 7/18* (2006.01)

(52) U.S. Cl.
  CPC ... *H04N 21/2385* (2013.01); *H04N 21/44209* (2013.01); *H04N 21/6437* (2013.01); *G06V 20/38* (2022.01); *G06V 20/44* (2022.01); *G06V 20/52* (2022.01); *H04N 7/186* (2013.01)

(58) Field of Classification Search
  CPC .............. H04L 65/608; G06K 9/00697; G06K 9/00771
  USPC ........................................................... 725/95
  See application file for complete search history.

(56) References Cited

U.S. PATENT DOCUMENTS

| | | | |
|---|---|---|---|
| 5,428,388 A | 6/1995 | von Bauer et al. | |
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,621,061 B2 | 12/2013 | Melnyk et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,361,011 B1 | 6/2016 | Burns et al. | |
| 9,473,406 B2 | 10/2016 | Penner et al. | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 10,484,730 B1 | 11/2019 | Li et al. | |
| 10,708,331 B1 | 7/2020 | Joliveau et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0095944 A1 | 5/2006 | Demircin et al. | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0053428 A1 | 3/2007 | Saleem et al. | |
| 2010/0225455 A1 | 9/2010 | Claiborne et al. | |
| 2012/0324123 A1* | 12/2012 | Fox ..................... H04N 21/222 709/231 |
| 2013/0007263 A1 | 1/2013 | Soroushian et al. | |
| 2013/0057695 A1 | 3/2013 | Huisking | |
| 2013/0115973 A1 | 5/2013 | Wigren et al. | |
| 2013/0166768 A1 | 6/2013 | Gouache et al. | |
| 2014/0019635 A1 | 1/2014 | Reznik et al. | |
| 2014/0267716 A1 | 9/2014 | Child et al. | |
| 2015/0035987 A1 | 2/2015 | Fernandez | |
| 2015/0113159 A1 | 4/2015 | Gogoi | |
| 2015/0113582 A1* | 4/2015 | Ushiyama ......... H04N 21/2402 725/115 |
| 2015/0163463 A1 | 6/2015 | Hwang et al. | |
| 2015/0262380 A1 | 9/2015 | Grasmug et al. | |
| 2015/0341248 A1 | 11/2015 | Deng et al. | |
| 2018/0115788 A1 | 4/2018 | Burns et al. | |
| 2020/0322441 A1 | 10/2020 | Fablet et al. | |

FOREIGN PATENT DOCUMENTS

| | | |
|---|---|---|
| CN | 106921860 | 7/2017 |
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |

(56) References Cited

FOREIGN PATENT DOCUMENTS

| JP | 2009008925 | 1/2009 |
|---|---|---|
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

OTHER PUBLICATIONS

H. Alverstrand, ED, RTCP message for Receiver Estimated Maxium Bitrate, Jan. 16, 2013, https://tools.ietf.org/id/draft-alvestrand-mcat-remb-02.html, accessed Dec. 5, 2019, 5 pgs.

Yu, Cheng, Basu, "Optimal adaptive bandwith monitoring for QoS based retrieval", Sep. 1, 2003, IEEE Transactions on Multimedia (vol. 5, Issue: 3, pp. 466-472) (year: 2003).

\* cited by examiner

| Version (V=2) | Padding (P=1) | Feedback Msg Type (FMT=5 bits) | Payload Type (PT=8 bits) | Length (L=20 bits) |
|---|---|---|---|---|
| Synchronization Source of Packet Sender (SSRC=32 bits) | | | | |
| Synchronization Source of Media Source (SSRC=32 bits) | | | | |
| Unique Identifier ('R' 'E' 'M' 'B'_'A' 'M' 'Z' 'N'=56 bits) | | | | |
| Num SSRC (Num=8 bits) | BR Exp (BRE=6 bits) | BR Mantissa (BRM=18 bits) | | |
| | | Confidence Value (CV=8 bits) | | |
| Synchronization Source Feedback (SSRC Feedback=32 bits) | | | | |

FIGURE 12B

BANDWIDTH ESTIMATION FOR VIDEO STREAMS

RELATED APPLICATIONS

This application is a continuation of and claims priority to U.S. application Ser. No. 16/519,626, filed Jul. 23, 2019. The entire disclosure of each of the above applications is incorporated herein by reference.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video recorded by an A/V recording and communication device can be uploaded to the cloud and recorded on a remote server. Subsequent review of the A/V footage can aid law enforcement in recording perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF DRAWINGS

The various embodiments of the present bandwidth estimation for video streams now will be discussed in detail with an emphasis on highlighting the advantageous features. These embodiments depict the novel and non-obvious bandwidth estimation for video streams shown in the accompanying drawings, which are for illustrative purposes only. These drawings include the following figures, in which like numerals indicate like parts:

FIGS. 12A and 12B are representative diagrams of a packet, according to various aspects of the present disclosure.

DETAILED DESCRIPTION

Figure 1:
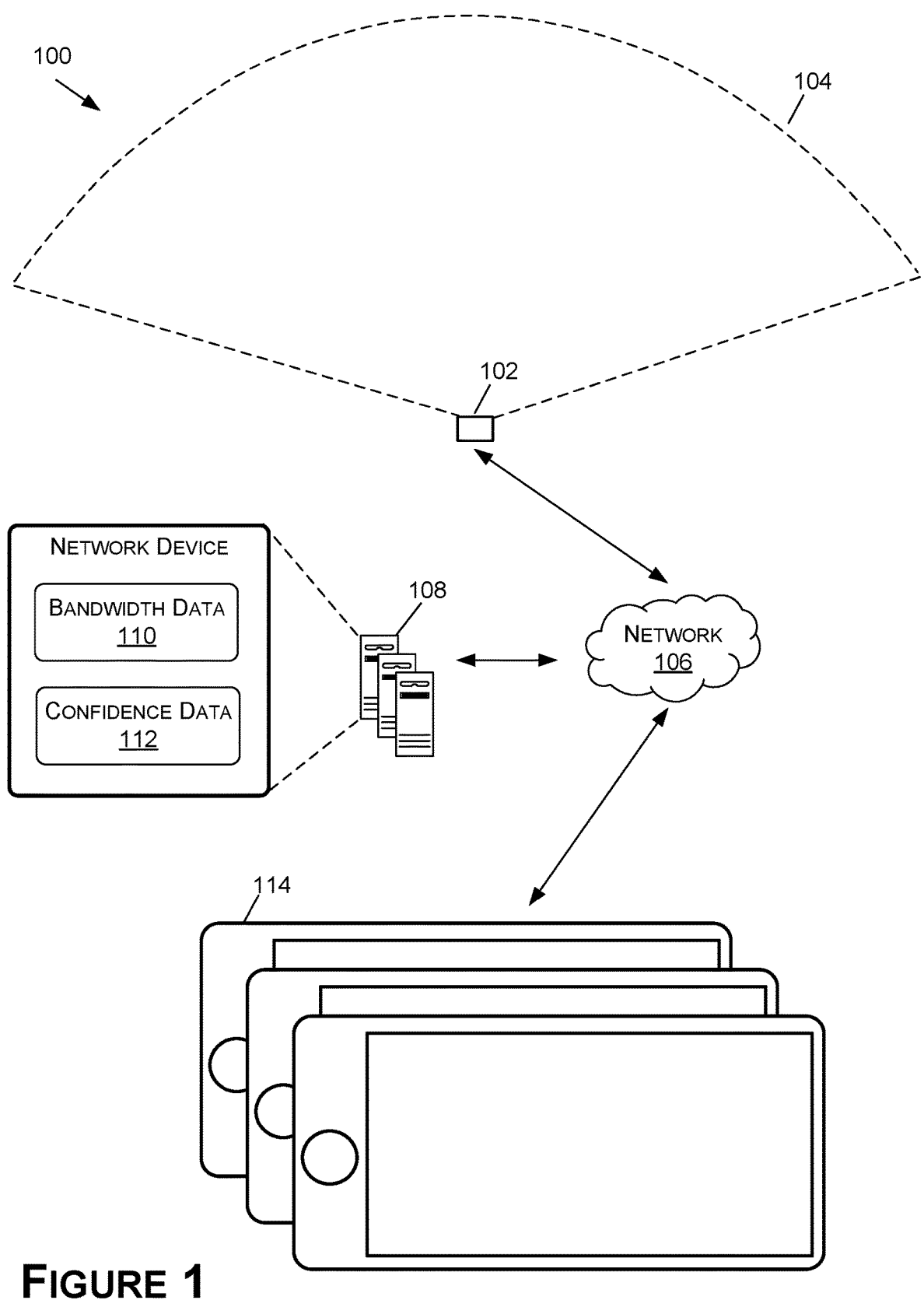
FIG. 1 is a schematic diagram of an example of a system for video streaming, according to various aspects of the present disclosure.

The present disclosure relates to systems and methods for bandwidth estimation for video streams (e.g., simultaneous video streams having different resolutions). Specifically, the present disclosure relates to systems and methods for video streams between an audio/video recording and communication device ("A/V device," may also be referred to as "camera device") and a user client device, using at least one server as an intermediary. Improved streaming quality to overcome deficiencies in existing streaming methods is provided by the present disclosure. For example, traditional streaming sessions can experience black video, buffering, freeze/black frames, etc. when they are not properly configured. In order to address those issues, the present disclosure provides a novel and unique approach for streaming video between devices over a network.

A streaming session may include a camera device recording and transmitting video to a user client device, via one or more servers, in real-time or near real-time. Client devices, though, can be mobile, such that the available bandwidth between the server and the client device may vary depending upon the location of the client device, and as the client device moves about. To provide a stream that can be viewed on a user client device when that device has a fast network connection, and when that device has a slow network connection, in embodiments according to the present disclosure the camera device can stream multiple versions of the same recorded video to the server at the same time. The server can then determine which version of the video to deliver to the client device based on the connection quality between the client device and the server.

Embodiments according to the present disclosure further address issues related to variable available bandwidth between the camera device and the server during a video streaming session, and adjusting characteristics of the streaming video between those devices based on changes to the available bandwidth. The present disclosure can be used to estimate a total bandwidth available between the camera device and the server, and use that estimation to send higher resolution video when possible. In one example, the total estimated bandwidth can be divided into a high-resolution stream and a low-resolution stream that are simultaneously delivered from the camera to the server. The server can then determine which one of the high-resolution stream and the low-resolution stream to deliver to the client device based on the connection quality between the client device and the server device.

As described above, embodiments of the present disclosure simultaneously transmit two video streams from the A/V device to the server(s), where a first one of the streams is high-resolution and a second one of the streams is low-resolution. The server then selects one of the two streams for transmission to a user client device based on current available bandwidth between the server(s) and the user client device. As the available bandwidth between the server(s) and the user client device fluctuates, the server may switch between sending the high-resolution and low-resolution streams to the user client device in order to provide the best possible video quality to the user client device.

The server may both relay the streams and provide feedback to the A/V device for improving the stream quality of the multi-stream streaming session based, in part, on performance metrics observed between the A/V device and the server. To provide feedback for improving the streams, the server may determine the total available channel capacity (e.g., throughput, bandwidth, bitrate, latency, etc.) between the server and the A/V device. A bandwidth estimation process is one way of determining a total available bitrate. For example, the server can use monitored performance metrics under different protocols, such as, for example, packet arrival delays, jitter, number of retries (to send packets), packet losses, etc. to determine the estimated available channel capacity and then send the estimated channel capacity to the A/V device in a networking message payload (e.g., a receiver estimated maximum bitrate (REMB) message). The server 224 can also implement different protocols for obtaining the performance metrics, such as for example, a WebRTC API, User Datagram Protocol (UDP), real-time transfer protocol (RTP), real-time streaming protocol (RTSP), real-time transport control protocol (RTCP), etc.

The server can also determine a level of confidence for the available bandwidth based on a combination of factors. For example, as the duration of a particular streaming session increases, the bandwidth estimates may be more accurate because there is a larger pool of data points from which to make determinations. Once the duration has reached a certain point (e.g., one minute) then the data can be based on a moving window for that duration such that the most recent data is being used in the bandwidth estimates and confidence values. The confidence level, in some embodiments, can be determined by using a weighted calculation including the measured REMB values, other observed performance metrics, such as dropped packets, and a current duration of the streaming session. Based on these variables, the server can calculate a confidence value for how accurate the provided bandwidth estimates are likely to be. To provide the confidence value, the server can include the confidence value as an additional field in the REMB message sent to the A/V device, in some embodiments. In one example, the REMB message can include quantitative values (e.g., low, medium, high, etc.) for the estimated bandwidth and the confidence value.

The server can monitor stream quality during a streaming session, calculate bandwidth estimates, calculate confidence values for the estimates and periodically transmit REMB messages with the bandwidth estimates and confidence values to the A/V device. The A/V device can include any device that can record video, for example, a camera device. In at least some embodiments, the A/V device can also record audio. The A/V device may adaptively adjust the quality of one or both of the streams within a streaming session based on the data in the REMB messages received from the server. For example, the A/V device can obtain or calculate the quantitative values for the estimated bandwidth and the confidence value from the REMB message and associate those values with a resolution lookup table in local memory. The table can include entries associated with the estimated bandwidth and the confidence value that define different stream quality thresholds. The table can include entries for both the first high-resolution stream and the second low-resolution stream, and metrics for the stream qualities that the respective streams should have. For example, the table can define the resolution and frame rate for each of the streams based on the quantitative values in the REMB message. While the streaming session is active, the A/V device can adaptively adjust the stream quality of one or both streams based on the received REMB message and the values in the table associated with the quantitative values in the REMB messages. Therefore, the quality of the streams within the streaming session may be continually updated to match the capacity of the connection between the transmitting device (the camera device) and the receiving device (e.g., one or more servers).

In an example operation, the A/V device can implement a method for generating a video stream including video data from a camera and/or an audio stream including audio received from a microphone. The video and/or audio stream can be generated within a multi-stream streaming session including a first stream and a second stream. The first stream can be generated with a first resolution, a first frame rate, and a first bitrate, and the second stream can be generated with a second resolution, a second frame rate, and a second bitrate. Thereafter, the A/V device can simultaneously transmit the first video stream and the second video stream to a network device for retransmission of one of the two streams to another device. Additionally, the A/V device can implement a method for adaptively adjusting the stream(s) based on perceived network performance between the A/V device and the receiving device. The A/V device can adapt the streams based on an estimate of a maximum available transmission bandwidth and a confidence value associated with the estimate of the maximum available transmission bandwidth received from the network device during the streaming session.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of a system 100 for improving video streams transmitted by an audio/video (A/V) recording and communication device 102, according to various aspects of the present disclosure. In some embodiments, the video streams comprise live video provided to a client computing device for play/display. In some embodiments, the A/V device 102 can include a combination of audio/video recording components, such as for example, a camera and a microphone, among other components. An example of an A/V device 102 is shown and described in more detail with respect to FIGS. 3 and 4. The A/V device 102 may record audio and video data within a predetermined area 104, transform the recorded audio and video data into one or more A/V streams, and transmit the one or more A/V streams over a communications network 106 to one or more other devices. The communications network 106 can include any combination of networks, such as, for example, the networks shown and described in more detail with respect to FIG. 2.

Figure 2:
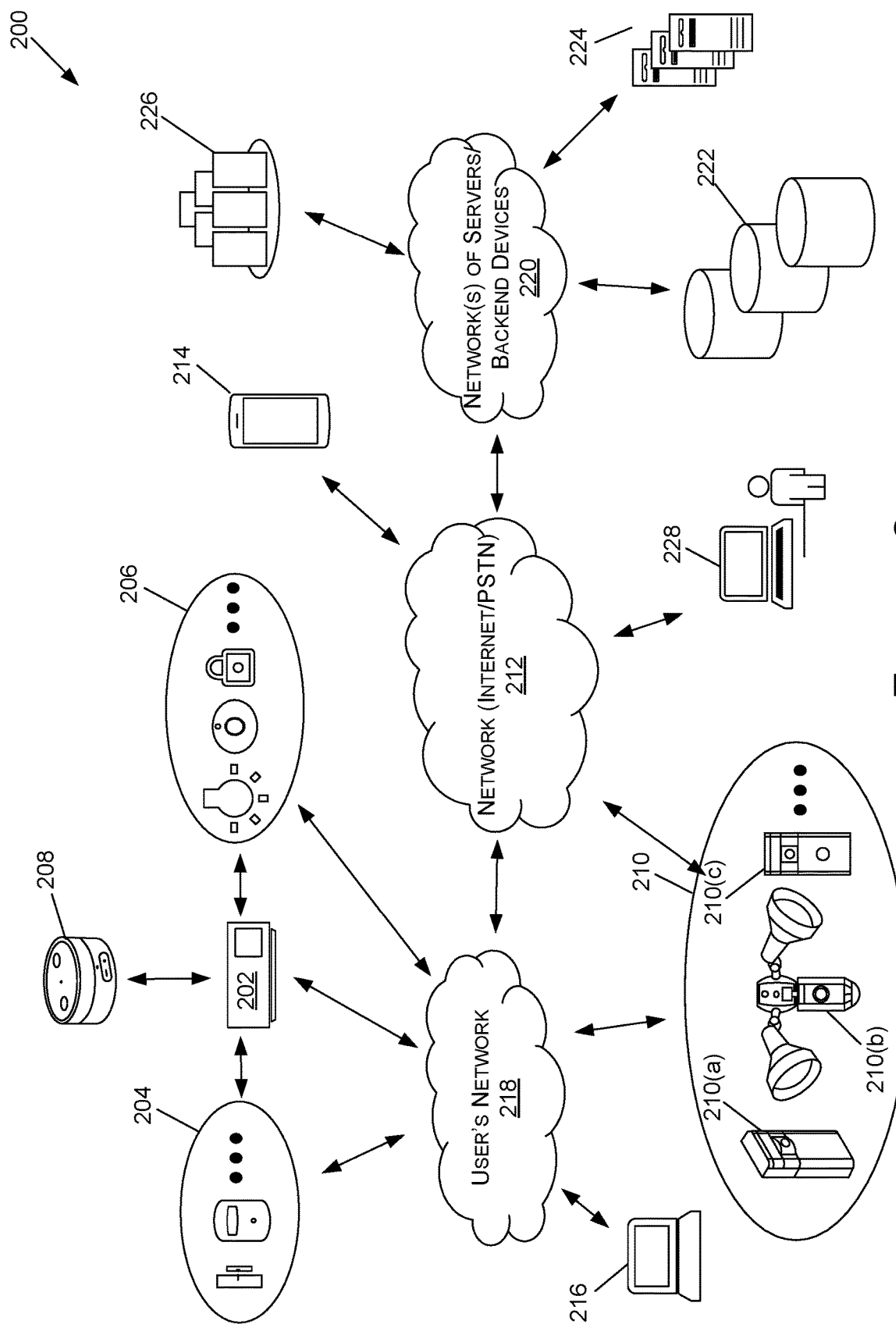
FIG. 2 is a functional block diagram illustrating a system for communicating in a network according to various aspects of the present disclosure.
Figure 4:
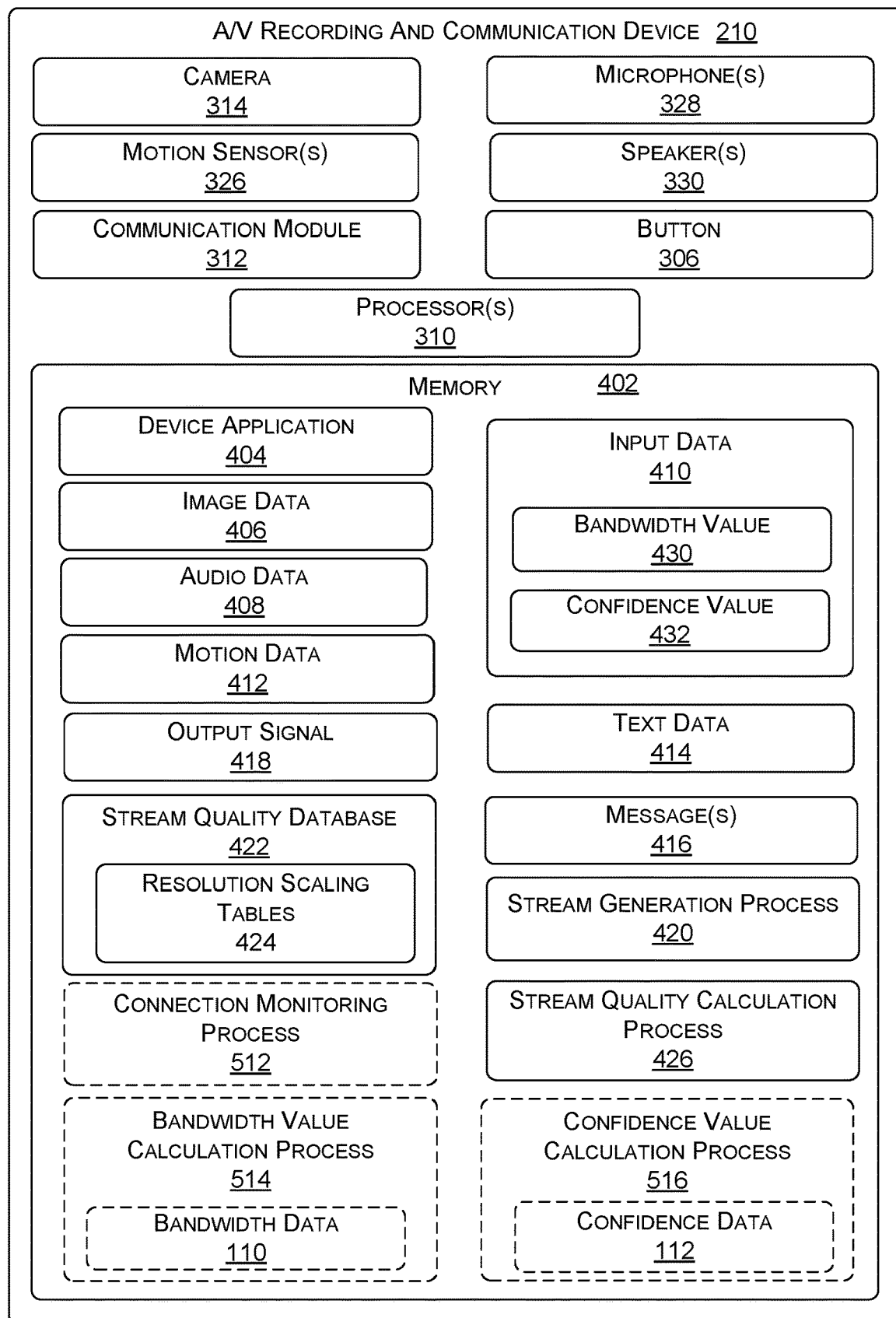
FIG. 4 is a functional block diagram illustrating one example embodiment of an A/V recording and communication device according to various aspects of the present disclosure.
Figure 5:
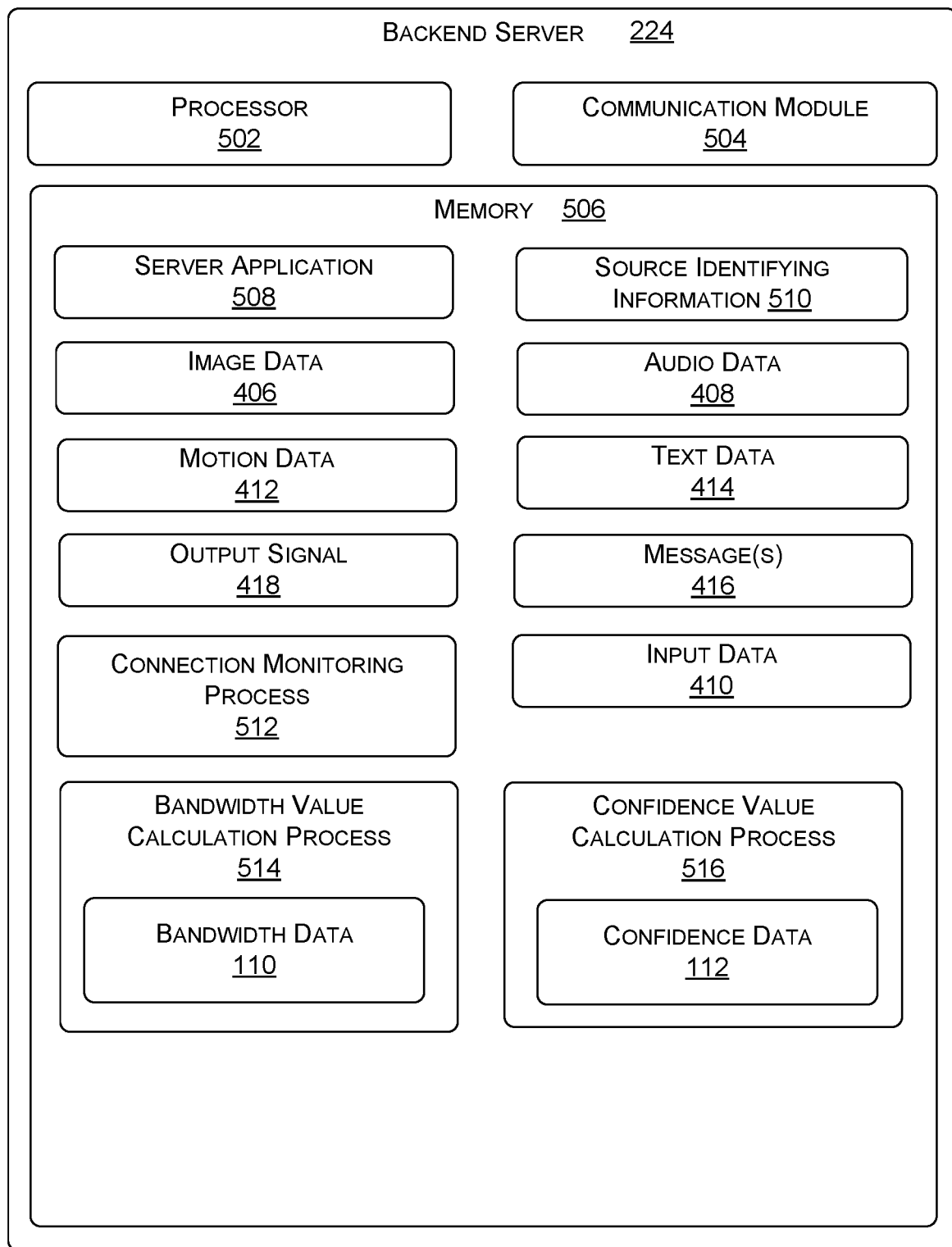
FIG. 5 is a functional block diagram illustrating one example embodiment of a backend device according to various aspects of the present disclosure.

The system 100 can also include a backend computing system 108, for example, the server 224 shown and described in more detail with respect to FIGS. 2 and 5. In some embodiments, the backend computing system 108 may receive, process, transform, and/or relay audio and video from the A/V device 102. In some embodiments, the backend computing system 108 may receive or otherwise obtain bandwidth data 110 and confidence data 112, to be used in accordance with the present disclosure. The bandwidth data 110 can include any combination of data that can be used to determine an estimated amount of available bandwidth between two devices, such as, for example, between the backend computing system 108 and the A/V device 102. For example, the bandwidth data 110 can include captured network traffic, timestamps, etc. As discussed in greater detail herein, the estimated bandwidth can be stored as a quantitative bandwidth value 430 (FIG. 4). The confidence data 112 can include any combination of data that can be used to convey and/or calculate a level of accuracy of the bandwidth value 430. In some embodiments, the confidence data 112 can include data pulled from statistics available through the underlying protocol, such as WebRTC statistics. For example, the confidence data 112 can be data based on measured REMB values, packet arrival delays, a stream duration, packet delay, frame delay, error number, etc. In some embodiments, the bandwidth data 110 and the confidence data 112 can be buffered historic data that is captured over a predetermined period of time. As discussed in greater detail herein, the confidence data 112 can be used to calculate a confidence value 412.

Figure 6:
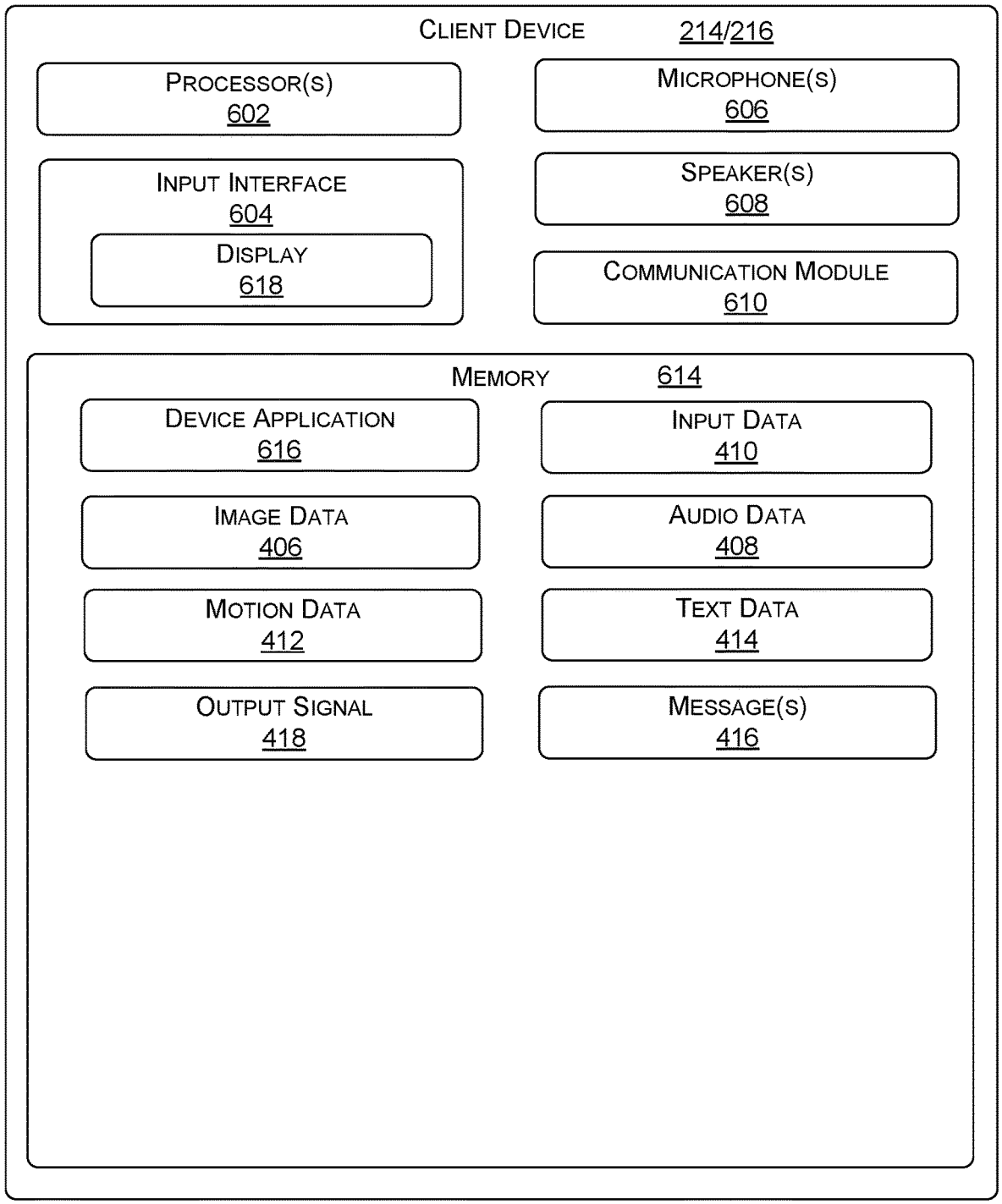
FIG. 6 is a functional block diagram illustrating one example embodiment of a client device according to various aspects of the present disclosure.

The system 100 can further include one or more client devices 114, for example, the client devices shown and described in more detail with respect to FIGS. 2 and 6. A client device 114 can be any end-user device configured to receive and display data from the backend computing system 108.

In an example operation, as discussed in greater detail with respect to FIGS. 4-9, the backend computing system 108 communicates with the A/V device 102 and tracks the communication to determine an estimated bandwidth. The backend computing system 108 may also determine a confidence value for the bandwidth estimation. Thereafter, the backend computing system 108 provides the estimated bandwidth and confidence value to the A/V device 102. The A/V device 102 can use the bandwidth estimate and confidence value to select a quality of the streams to be generated by the A/V device 102 for transmission to the backend computing system 108. The backend computing system 108 can receive the streams generated by the A/V device 102 and select one of the received streams for transmission to the one or more client devices 114 for display. For example, if the backend computing system 108 determines that a connection with the client device 114 is poor (e.g., slow), then the backend computing system 108 will relay the low-resolution stream. Similarly, if the connection between the backend computing system 108 and the client device 114 is good (e.g., fast), the high-resolution stream can be relayed.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/$CO_2$ detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V devices 210 (alternatively referred to herein as "A/V devices 210" or "A/V device 210") (which may represent, and/or be similar to, the A/V device 114 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the doorjamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216 (which may represent, and/or be similar to, the client device 114 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more servers 224, and one or more backend application programming interfaces (APIs)

226. While FIG. 2 illustrates the storage device 222, the server 224, and the backend API 226 as components separate from the network 220, it is to be understood that the storage device 222, the server 224, and/or the backend API 226 may be considered to be components of the network 220. For example, the network 220 may include a data center with a plurality of computing resources used to implement the storage device 222, the server 224, and the backend API 226.

The server 224 may comprise a computer program or other computer executable code that, when executed by processor(s) of the server 224, causes the server 224 to wait for requests from other computer systems or software (clients) and provide responses. In an embodiment, the server 224 shares data and/or hardware and/or software resources among the client devices 214, 216. This architecture is called the client-server model. The client devices 214, 216 may run on the same computer or may connect to the server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB 1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the server 224, the backend API 226, the storage devices 222, etc.) may be referred to herein as a "network device" or "network devices." The backend device 108 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of servers/backend devices 220).

Figure 3:
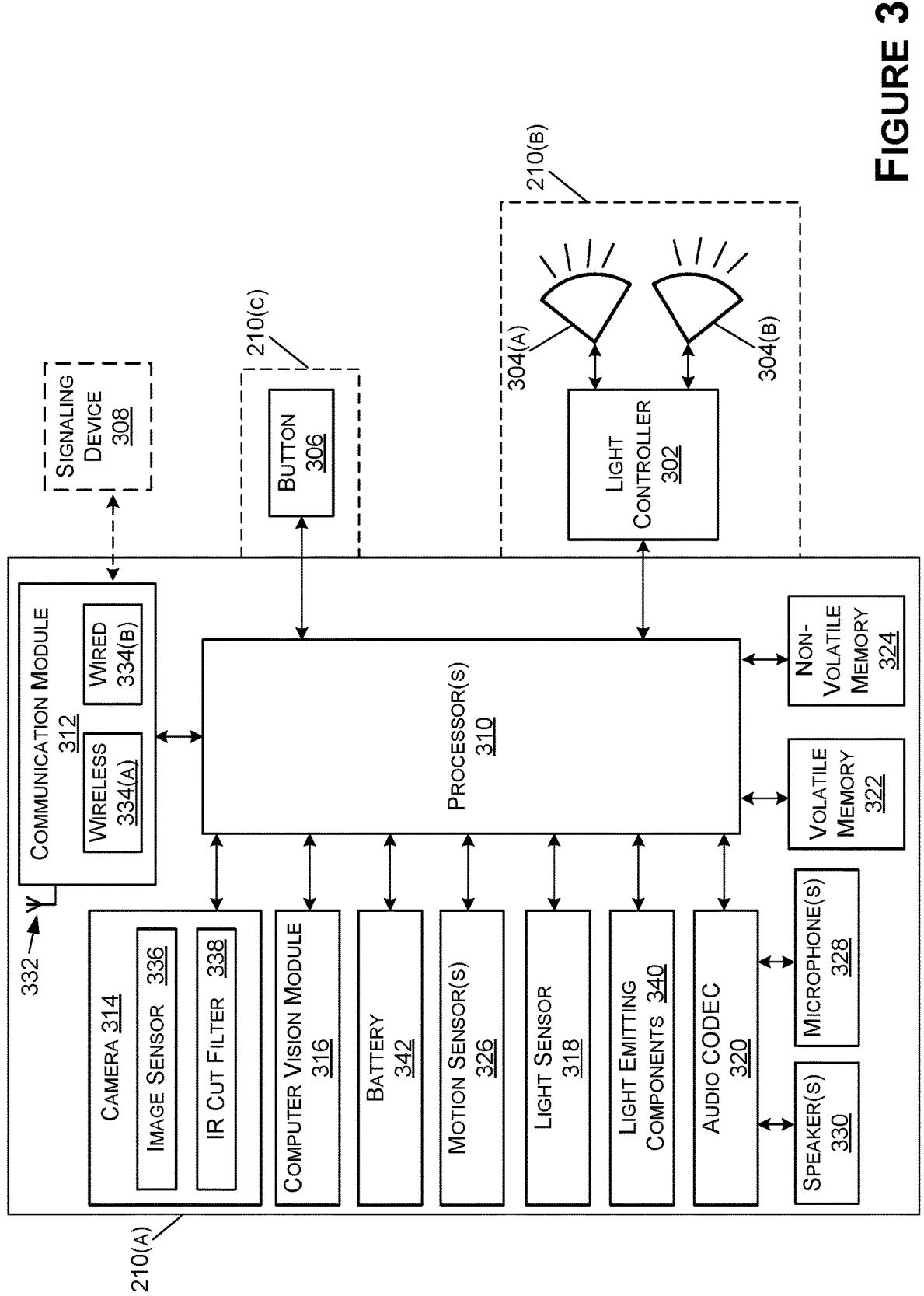
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including client device 214, 216 and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRANI (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRANI (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SDRAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data recorded by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be recorded by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of video images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to ensure that it satisfies certain assumptions implied by the method. Examples of pre-processing include, but are not limited to re-sampling in order to ensure that the image coordinate system is correct, noise reduction in order to ensure that sensor noise does not introduce false information, contrast enhancement to ensure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two mam approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to record information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of recording 3D face imagery. The sensors work by projecting structured light onto the face. Up to a dozen or more of these image sensors can be placed on the same CMOS chip—each sensor records a different part of the spectrum.

Another variation is to record a 3D picture by using three tracking cameras that point at different angles; one camera pointing at the front of the subject, a second one to the side, and a third one at an angle. All these cameras work together to track a subject's face in real time and to enable face detection and recognition.

Another emerging trend uses the visual details of the skin, as recorded in standard digital or scanned images. This technique, called skin texture analysis, turns the unique lines, patterns, and spots apparent in a person's skin into a mathematical space.

Another form of taking input data for face recognition by using thermal cameras, which may only detect the shape of the head and ignore the subject accessories such as glasses, hats, or make up.

Further examples of automatic identification and data record (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V device 210 is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

FIG. 4 is another functional block diagram illustrating an embodiment of the A/V device 210 according to various aspects of the present disclosure. In some embodiments, the A/V device 210 may represent, and further include one or more of the components from, the A/V doorbell 210(c), the A/V security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to record image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

At least some of the processes of the server 224, the hub device 202, and/or the client device 214, 216 described herein may be executed by the A/V device 210. In addition, in some embodiments, the A/V device 210 may be configured to record A/V data (e.g., image data 406, audio data 408, motion data 412, text data 414, etc.) for use by the A/V device 210 to create A/V streams. In some embodiments, the A/V device 210 may to record A/V data from various multimedia components, such as the camera 314, microphone 328, motion sensors, button 206, etc. and compile that data using the processor(s) 310. The recorded A/V data can be buffered and/or stored within memory 402 for use by the device application 404 and other processes.

In some embodiments, the processor(s) 310 of the A/V device 210 can use a stream generation process 420 to transform the recorded and/or stored A/V data into a combination of high-resolution and low-resolution streams in a format that can be transmitted to and viewed by other computing devices (e.g., the client devices 214, 216). For example, the processor(s) 310 can transform the recorded A/V data into a video format suitable for generating and transmitting a stream, in real-time or near real-time, over the network 106 to other computing devices for display. The generation of the stream can include modifying the A/V data and/or the stream itself to improve quality of delivery and/or quality of displaying the stream on the destination computing devices. For example, the generation of the stream can include any combination of protocols and protocol formats for fine tuning the encoding of the streams by adjusting a frame rate of the stream, adjusting a bitrate of the stream, adjusting stream resolution, adjusting temporal scalability, etc.

In some embodiments, the stream generation process 420 can simultaneously generate two streams from the same A/V data, one being a high-resolution stream and the other being a low-resolution stream. In some embodiments, the stream generation process 420 can determine quality (e.g., resolution, framerate, bitrate, etc.) of the streams based on input data 410 received from another device, such as the server 224. For example, the server 224 can transmit data to the A/V device 210, including the bandwidth value 430 and/or the confidence value 412. Once received by the A/V device 210, the input data 410, including the bandwidth value 430 and/or the confidence value 412, can be stored in memory 402 for additional processing. In one example, the stream generation process 420 can determine the quality of the streams based on the bandwidth value 430 alone. More specifically, a total allowed bitrate, provided within the bandwidth value 430, can be divided by the stream generation process 420 between multiple streams statically. For example, the overall bitrate, defined in the bandwidth value 430, can be divided to include 70% of the total bitrate for a first high-resolution stream and 30% of the total bitrate for a second low-resolution stream.

In some embodiments, the stream generation process 420 can also use the combination of the bandwidth value 430 and the confidence value 432 to dynamically modify the stream quality generation for each stream and make it more robust. In one example, if the bandwidth value 430 and the confidence value 432 are high, then the stream generation process 420 can set the resolution for the streams at highest possible to current maximum resolution and the bitrate can be fairly divided between the streams based on the highest resolutions. Similarly, if bandwidth value 430 and the confidence value 432 are low the stream generation process 420 should use smallest possible resolution for the secondary streams. For example, if allowed resolution options are 1080p, 720p, 480p and 360p and the bandwidth value 430 indicates that the current allowed bandwidth is high and the confidence value 432 indicates that confidence is high, the stream generation process 420 may choose 1080p for the high-resolution stream and 720p for the low-resolution stream. In contrast, if the bandwidth value 430 indicates that the allowed bandwidth is high but the confidence value 432 indicates that confidence is low, the stream generation process 420 can choose 1080p and 360p for the respective resolutions.

In operation, the high-resolution stream and the low-resolution stream to use substantially all of the estimated total bandwidth between the server 224 and the A/V device 210. For example, if the estimated total bandwidth is 125,000,000 bytes per second. As would be appreciated by one skilled in the art, estimated total bandwidth can be divided among the high-resolution stream and the low-resolution stream using any combination of methodologies. For example, if allowed resolution options are 1080p, 720p, 480p, and 360p, and the bandwidth value 430 indicates that the current available bandwidth is high, and the confidence value 432 indicates that confidence is high, the stream generation process 420 may choose 1080p for the high-resolution stream and 720p for the low-resolution stream. In contrast, if the bandwidth value 430 indicates that the available bandwidth is high, but the confidence value 432 indicates that confidence is low, the stream generation process 420 may choose 1080p and 360p for the respective resolutions.

The criteria for the level of quality for generating each of the streams can be determined by the processor(s) 310 referencing information stored in the memory 402. In some embodiments, the quality of the streams can be based on input data 410 received from another device (e.g., the server 224) and the data stored within a stream quality database 422. For example, once the A/V device 102 receives the input data 410, the stream generation process 420 can refer to the stream quality database 422 and select stream quality criteria (e.g., bitrate and resolution) for generating each stream based, in part, on the input data 410.

In some embodiments, the bitrate distribution between the high-resolution stream and the low-resolution stream can be based on a ratio between resolutions. For example, for a 1080p high-resolution stream and a 720p low-resolution stream, 720p has two times less pixels than 1080p, so about 67% of the bandwidth can be allocated to the 1080p stream and about 33% of the bandwidth can be allocated to the 720p stream. When the confidence value 432 indicates a high level of confidence, this ratio may prevail. However, if the confidence value 432 indicates a low level of confidence, the stream generation process 420 may shift more of the bandwidth (e.g., more bits per second) to the high-resolution stream to increase the likelihood that the high-resolution stream is transmitted at a high quality. To divide the overall bandwidth (e.g., the total available bitrate according to the bandwidth value 430), any combination of different strategies can be used to divide bits without departing from the scope of the present disclosure. For example, different allocations could be coded into a two-dimensional table, and stored in the stream quality database 422 for choosing different partitioning depending on current bandwidth value 430 and confidence value 432.

In some embodiments, the stream quality database 422 can include one or more stream resolution scaling tables 424 defining how the available bitrate should be allocated between the two streams by the stream generation process 420. For example, the values within the scaling tables 424 can define boundaries for the quantitative thresholds (e.g., low, medium, high, etc.) based on scaling parameters (e.g., bandwidth value 430 and confidence value 432). The stream resolution scaling tables 424 can include any combination of data structures, such as for example, a lookup table in which resolutions are associated with the input data 410. The data within the resolution scaling tables 424 can be any combination of static or variable values. In one example, the processor(s) 310 of the A/V device 210 can look up the resolutions for the streams within the stream resolution scaling tables 424 based on the input data 410. While the present embodiments are described with reference to the scaling tables 424, alternative embodiments may include a bitrate matrix, database entries, an index, and/or a lookup table instead of, or in addition to, the scaling tables 424.

In some embodiments, the stream resolution scaling tables 424 can be used by the processor(s) 310, in conjunction with the bandwidth value 430 and the confidence value 432, to determine the quality of streams that should be generated. For example, the processor(s) 310 may compare the bandwidth value 430 and the confidence value 432 to entries within the scaling tables 424 of the stream quality database 422 to determine what resolutions the stream generation process 420 should use to generate the respective streams. TABLE 1, below, provides an example scaling table 424 for determining resolutions for a high-resolution stream and a low-resolution stream based on predetermined thresholds (e.g., low/high).

TABLE 1

| Available Bandwidth/ Confidence Value | High-Resolution (First) Stream Resolution @ Frame Rate/Percentage of Total Bitrate | Low-Resolution (Second) Stream Resolution @ Frame Rate/Percentage of Total Bitrate |
| --- | --- | --- |
| High/High | 1080 p @ 100/65% | 720 p @ 100/35% |
| High/Medium | 1080 p @ 100/80% | 720 p @ 20/20% |
| High/Low | 1080 p @ 100/90% | 360 p @ 20/10% |
| Medium/High | 720 p @ 100/65% | 720 p @ 100/35% |
| Medium/Medium | 720 p @ 100/80% | 720 p @ 15/20% |

TABLE 1-continued

| Available Bandwidth/ Confidence Value | High-Resolution (First) Stream Resolution @ Frame Rate/Percentage of Total Bitrate | Low-Resolution (Second) Stream Resolution @ Frame Rate/Percentage of Total Bitrate |
|---|---|---|
| Medium/Low | 720 p @ 20/90% | 360 p @ 15/10% |
| Low/High | 720 p @ 20/90% | 360 p @ 15/10% |
| Low/Medium | 360 p @ 20/90% | 360 p @ 15/10% |
| Low/Low | 360 p @ 15/100% | 360 p/0% (not stream at all) |

As shown in TABLE 1, depending on the input data 410 of the bandwidth value 430 and the confidence value 432, a particular resolution, frame rate, and percentage of the total bitrate for each stream can be determined by referencing the scaling table 424. For example, if the bandwidth value 430 indicates a medium bandwidth level and the confidence value 432 indicates a low bandwidth level, then the stream generation process 420 may generate the streams corresponding to those values in the scaling table 424. In this example, the stream generation process 420 would generate a first stream (high-resolution stream) with 720p resolution at 20 frames per second and a second stream (low-resolution stream) with 360p resolution at 15 frames per second. The values shown in TABLE 1 are examples only, and the values within the scaling table 424 can be selected based on a desired quality of viewing for the receiving user. For example, these values can be selected based on any criteria, such as any combination of user preference, experimentation, computer algorithms, etc. In some embodiments, the scaling table 424 can also limit the number of streams to be generated. For example, if the bandwidth value 430 indicates a low bandwidth level and the confidence value 432 indicates a low bandwidth level, then the stream generation process 420 may only generate a single stream.

In the example of TABLE 1, the available bandwidth value 430 and the confidence value 432 each have three possible values: High, Medium, or Low. These values are examples of thresholds or ranges for the quantitative values that are calculated, by the server 224, from the bandwidth data 110 and the confidence data 112. For example, the bandwidth value 430 and the confidence value 432 can each be values ranging from 0 to 100, and the Low, Medium, or High quantitative values within the scaling table 424 can represent different thresholds or ranges within that range (e.g., 0-33 for Low, 34-66 for Medium, 67-100 for High). While the example of TABLE 1 includes three possible values (Low, Medium, or High) for the inputs to the table, other embodiments may include fewer or more possible values for the inputs to the table, for example, by updating the thresholds. Still further, other embodiments may include fewer or more than two inputs to the table.

The data within the scaling table 424 can include any number of streams with any combination of resolution, bitrate, frame rate, etc. broken down into any combination of percentages for each stream. For example, the percentage calculations in TABLE 1 are based on the pixel totals as follows: 1080p-2,073,600, 720p-921,600, 480p-307,200. Using these pixel values, when the high-resolution stream is 1080p and the low-resolution stream is 720p, the high-resolution stream will get 69% of the total available bitrate (e.g., 2,073,600+921,600=2,995,200, and 2,073,600/2,995,200=0.6923). TABLE 1 is provided for example purposes only and is not intended to limit the present disclosure to the values within TABLE 1. Similarly, although the present disclosure discusses examples generating a high-resolution stream and a low-resolution stream, any number of streams can be generated at a time without departing from the scope of the present disclosure. For example, a high-resolution stream, a medium resolution-stream, and a low-resolution stream can be simultaneously generated by the A/V device 210.

The number of entries within the resolution scaling tables 424 can be based on the number of bits provided within the input data 410. In some embodiments, the combination of the bandwidth value 430 and the confidence value 432 can be combined into a quantitative value with a set number of bits that can be transformed by the processor(s) 310 into a threshold value(s) (e.g., low, medium, high), for example, TABLE 1 can be calculated from a 6-bit input (e.g., 100100 for high/high, 010010 for medium/medium, 001001 for low/low, etc.). In some embodiments, the confidence value 432 can be formatted to include trailing can include count trailing zero (ctz) counts to lookup values in the scaling tables 424 For example, if '100' represents a high value, then adding a trailing zero would modify the '1000' to represent a high value. Including the trailing bits can increase the number of bits in the input. For example, the 6-bit example above can include trailing zero bits to create an 8-bit input of 10001000. The larger the number of bits implemented for the input data 410 and the corresponding scaling table 424, the greater the number of resolution combinations and more precise threshold ranges that the stream generation process 420 can operate within.

In some embodiments, the resolution of the streams can be modified as the bandwidth data 110 and/or the confidence data 112 changes during a streaming session. The modification can take place dynamically, based on changes to the received input data 410, or before starting a stream. The received input data 410 can include the bandwidth value 430, the confidence value 432, and any other information received by the A/V device 210. For example, the stream generation process 420 can use networking statistics to make small adjustments to the quality of one or more streams, for example based on observed packet losses experienced by the server 224. In another example, if the resolution of the first stream is low (e.g., 360p@20 fps), the stream generation process 420 can generate the second stream as a spatially decimated version of the first stream to avoid sending two identical streams. Temporal Scalable Video Coding (TSVC) can be used in some embodiments for generating video streams that don't have temporal dependencies for some frames, and unreferenced frames can be discarded if there is insufficient bandwidth available.

Referring to FIG. 4, in some embodiments, in addition to or in place of the stream quality database 422 and scaling tables 424, the processor(s) 310 can use a stream quality calculation process 426 to determine the quality of the streams to be generated. The stream quality calculation process 426 can include a dynamic or periodic calculation for stream quality based on a combination of factors. For example, the stream quality calculation process 426 can use some combination of algorithms, artificial intelligence, fuzzy logic, etc. to determine the values that should be used by the stream generation process 420 to generate the streams. The values provided by the stream quality calculation process 426 can be used to update the scaling tables 424, or can be used in place of values within the scaling tables 424.

In some embodiments, as the streams are generated by the stream generation process 420, the streams can be simultaneously transmitted by the A/V device 210, via the communication module 312, to another device. For example, a high-resolution stream and a low-resolution stream (of the same A/V content) can be transmitted by the A/V device 210 to the backed server 224 and subsequently relayed to a client device 214, 216. During a streaming session transmission, the processor(s) 310 can format the streams according to one or more transportation protocols. For example, the processor(s) 310 can format the streams accordingly to any combination of the real-time transfer protocol (RTP), real-time streaming protocol (RTSP), real-time transport control protocol (RTCP), etc.

FIG. 5 is a functional block diagram illustrating one embodiment of the server 224 according to various aspects of the present disclosure. The server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 406 (also referred to as "second image data") generated by the A/V devices 230.

Although referred to as the server 224 with reference to the processes described herein, the server 224 may additionally, or alternatively, include one or more of the devices from the network(s) of servers/backend devices 220. For example, the processes described herein with respect to the server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 406.

As described herein, at least some of the processes of the A/V device 210, the hub device 202, and/or the client device 214, 216 may be executed by the server 224. The server 224 may perform novel and unique processing in accordance with the present disclosure. In some embodiments, the server 224 can include programming for performing a connection monitoring process 512. The processor 502 can access the connection monitoring process 512 to establish and monitor performance metrics, network traffic, and other communication characteristics between the server 224 and other computing devices. For example, the connection monitoring process 512 can be used to monitor activity, such as packet arrival delays, jitter, number of retries (to send packets), packet losses, etc., while the server 224 receives a real-time stream from the A/V device 210. The connection monitoring process 512 can monitor real-time communication over one or more application programming interfaces (APIs). In some embodiments, the connection monitoring process 512 can be executed by the A/V device 210.

In some embodiments, the connection monitoring process 512 can use a Web Real-Time Communication (WebRTC) application to monitor network usage between the server 224 and any of the A/V device 210, the hub device 202, and/or the client device 214, 216. WebRTC may be used to enable browsers and/or mobile applications to directly exchange real-time media with other browsers and/or mobile applications in real-time communication (RTC). WebRTC can be implemented using an application programming interfaces (APIs) to establish peer-to-peer communications between browsers or mobile applications. WebRTC includes APIs that are designed to acquire video data, transfer video data between peer devices, and enable other bi-directional communications between peer devices. WebRTC also includes APIs for collecting statistics about WebRTC sessions. The statistics may include statistics stream characteristics related to packets received, bytes received, packets lost, jitter, packets sent, bytes sent, etc.

Implementing WebRTC or similar programming, the connection monitoring process 512 can monitor communication traffic over the network 106 to measure a combination of channel capacity, available bandwidth, and bulk transfer capacity during a real-time connection. In some embodiments, the connection monitoring process 512 can process RTP data in the form of an RTP dump. For example, the RTP dump can include buffered statistics for the active streaming sessions, such as, for example, packet delay, jitter, number of retries (to send packets), packet losses, etc., that can be used to estimate an available bandwidth.

In some embodiments, based on the protocol being used and the bandwidth data 110 gathered by the connection monitoring process 512, the processor 502 can use a bandwidth value calculation process 514 to calculate the bandwidth value 430, such as an estimated available bandwidth for a particular connection between the server 224 and another device. For example, the processor 502 can use the bandwidth value calculation process 514 to determine the bandwidth value 430 for an available bandwidth or bitrate while the server 224 receives a real-time stream from the A/V device 210. When using programming such as WebRTC, the processor 502 can use the bandwidth value calculation process 514 to create an estimated bandwidth value 430 using the bandwidth data 110.

While the server 224 receives a real-time stream, it can use the bandwidth value calculation process 514 to estimate currently available bandwidth between the devices. In some instances, the bandwidth estimation can be based, in part, on delay of RTP packets received during the stream. The processor 502 can package that bandwidth estimation as bandwidth value 430 and include it within a message for transmission to and use by another device.

Figure 12A:
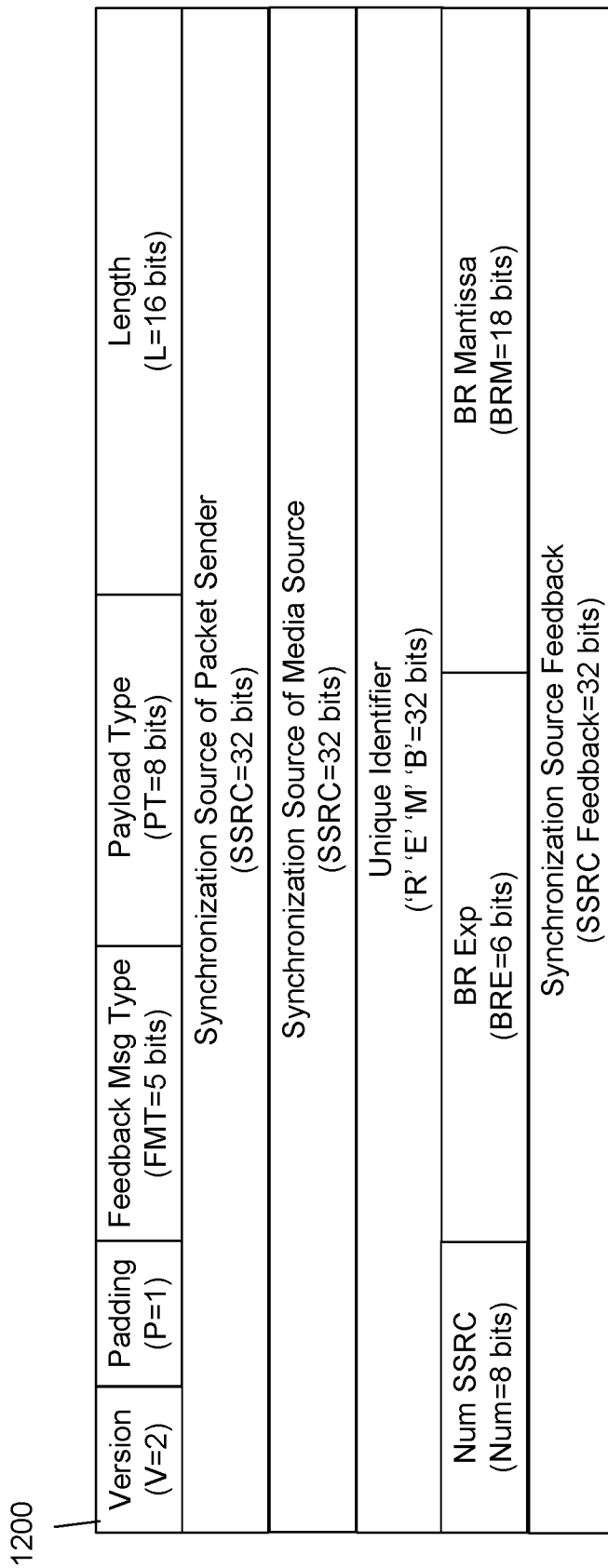

In some embodiments, the bandwidth value calculation process 514 can package the bandwidth value 430 within a receiver estimated maximum bitrate (REMB) message and transmit it to the A/V device 210. REMB is an RTCP message used to provide bandwidth estimation which may be used to avoid generating congestion on a network. The REMB message may include fields that convey a total estimated available bitrate on a communication path between devices which can be available for video encoding. REMB messages are supported by WebRTC and other protocols. Referring to FIGS. 12A and 12B, example formats for REMB messages are provided. In some embodiments, the bandwidth value calculation process 514 can be implemented by the A/V device 210.

FIG. 12A depicts a standard REMB message 1200 including fields for version (V), padding (P), feedback message type (FTP), payload type (PT), length, synchronization source (SSRC) of packet sender, SSRC of media source, unique identifier, num SSRC, BR exp, BR Mantissa, and SSRC feedback. The version can be 2 bits and identifies the RTP version associated with the REMB message. The padding can be 1 bit and identifies indicates whether or not REMB message packet contains additional padding octets and is set to 0 by default. The feedback message type can be 5 bits and identifies the type of feedback message is (e.g., transport layer, payload-specific, or application layer feedback). The payload type can be 8 bits and identifies the packet as an RTCP FB message. The length can be 16 bits and indicates the length of the message packet. The SSRC of packet sender can be 32 bits and provides an identifier for the originator of the packet. The SSRC of packet sender can be 32 bits and provides an identifier for the destination of the packet. The unique identifier can be 32 bits and is four ASCII characters (e.g., 'R' 'E' 'M' 'B'). The num SSRC can be 8 bits and is the number of SSRCs in the message. The BR Exp can be 6 bits and is the exponential scaling of the mantissa for the maximum total media bitrate value. The BR Mantissa can be 18 bits and is the mantissa of the maximum total media bitrate that the sender of the REMB estimates. The BR SSRC feedback can be 32 bits and includes one or more SSRC entries which this feedback message applies to.

FIG. 12B provides an example REMB message 1202 in accordance with the present disclosure. The bandwidth value 430 can be associated within at least one of the existing fields, such as the BR exp field and/or the BR Mantissa field. In some embodiments, the REMB message 1202 can include the same fields as the REMB message 1200 discussed with respect to FIG. 12A along with an additional field 1208 for the confidence value 432. For example, the field 1208 can be appended to the REMB message 1202 for the confidence value 432. In various embodiments, the field 1208 can include any range of bits needed to convey the confidence value 432. For example, the field 1208 can be 4-16 bits. In some embodiments, the number of bits within the length field can be increased to account for additional fields and/or fields that have increased in size. For example, the length can be 20 bits (e.g., 4+4+7+4+1)

In some embodiments, rather than appending the field 1208 to the REMB message 1202, the confidence value 432 can be indicated within other fields of the REMB message 1200 by using unused bits. For example, unused bits can be used to signal some additional extension hints, such as resolution usages and/or resolution splits hints. For example, it could signal to allocate all bits into one resolution. In various embodiments, the size of the payload type (PT) field may vary to indicate that the confidence value 432 is contained in unused bits of one or more fields of the REMB message 1200, and/or to indicate that the confidence value 432 is contained in the additional field 1208 appended to the REMB message 1202. In some embodiments, the PT field can be modified to indicate that it is a particular type of payload. For example, the PT field can be modified to be a=rtcp-fb:<payload type>"amz-remb-c. In some embodiments, the ASCII characters of the unique identifier can be modified to indicate that it is a particular type of message. For example, the ASCII characters can be modified to, for example, ('R' 'E' 'M' 'B'_'A' 'M' 'Z' 'N') using 56 bits. In some embodiments, once the fields have been modified and/or additional fields have been appended to the message 1202, the length of the message 1202 can be modified for the length of the payload (e.g., in bits). Any combination of message formats or protocols can be used to transmit the bandwidth value 430 and the confidence value 432 from the server 224 to the A/V device 210 without departing from the scope of the present disclosure.

In some embodiments, the REMB message can be a RTCP message used to provide a total estimated available bitrate between the server 224 and the A/V device 210 during an active stream. In some embodiments, the bandwidth value 430 can be included within the REMB message in a separate field designed to convey the estimated bandwidth available on the communication path between the server 224 and the A/V device 210. The REMB message can be used by the server 224 to convey to the A/V device 210 how the bitrate or resolution of the streams being transmitted to the server 224 should be adjusted, as discussed in greater detail herein. In some embodiments, the server 224 can periodically generate the REMB messages and transmit them to the A/V device 210. For example, the server 224 can generate and transmit REMB messages to the A/V device 210 every 200 ms, or at intervals of any other length of time, including irregular intervals. The periodically generated REMB messages can include re-determined bandwidth estimates and updated confidence values for the re-determined bandwidth estimates. The re-determined bandwidth estimates and updated confidence values may be based on the data observed during the streaming session. These updates can be calculated in real-time throughout the existence of the streaming session continuously using the updated connection observations for that streaming session.

In some embodiments, the server 224 can provide the confidence value 432 to the A/V device 210 with the bandwidth value 430 to convey a likelihood that the bandwidth value 430 is accurate. The confidence value 432 can be calculated from confidence data 112 that includes a combination of predetermined streaming session characteristics monitored by the server 224. Using the confidence data 112, the confidence value 432 can be calculated using a combination of methods, for example, by calculating the second moment for the bandwidth value 430. The server 224 can also adjust the confidence value 432 based on changes to the monitored characteristics, for example, the confidence value 432 can be decreased if an actual (observed) uplink bandwidth is determined to be lower than expected, or the confidence value 432 can be increased if an actual (observed) uplink bandwidth is determined to be higher than expected. For example, the monitored performance metrics can be used to determine the uplink bandwidth between the server 224 and the A/V device 210 is lower than expected or higher than expected.

The processor 502 can use a confidence value calculation process 516 to determine the confidence value 432 based on the confidence data 112 and the bandwidth data 110 aggregated by the connection monitoring process 512. In some embodiments, the confidence data 112 can include the same collection of streaming session statistics as the bandwidth data 100. For example, the confidence data can include statistics such as packet delay, jitter, number of retries (to send packets), packet losses, etc. The confidence value 432 can represent a quantitative confidence score or value that conveys a level of certainty that the bandwidth value 430 provided from the bandwidth value calculation process 514 is accurate. The confidence value calculation process 516 can use any combination of calculations for deriving the confidence value 432.

In some embodiments, the confidence value calculation process 516 can be implemented by the A/V device 210. In some embodiments, the confidence value calculation process 516 determines the confidence value using a three-part calculation using data obtained from the connection monitoring process 512 and the bandwidth value calculation process 514. The first part of the calculation includes a mathematical second moment (e.g., dispersion or deviation from average value) of measured REMB value calculated during the streaming session. The second part of the calculation includes a mathematical second moment (e.g., dispersion or deviation from average value) of packet arrival delays observed during the streaming session. The third part of the calculation includes weighting the first two parts against the duration of the streaming session. The weighting can be scaled such that as the duration of the streaming session increases, so will the accuracy and thus the confidence value 432. Once a particular duration has been established (e.g., one minute), the weighting can be capped. Thus, during the initial part of the streaming session the confidence value 432 can be low and can increase along with the streaming session duration until a particular period of time has elapsed from the beginning of the streaming session.

In some embodiments, the mathematical second moment of the estimated bandwidth value for i-th packet can be m_hist[i], a mathematical second moment of packet arrival delays can be m1[i], and the length of the streaming session with the A/V device 102 can be l1[i]. These values can be used with experimentally defined thresholds of t1, t2, t3. These can be combined within an if statement, for example, shown below:

If(l1[i]<t1) return m1[i];
Else if (l1[i]<t2) return 0.8*m1[i]+0.2*m_hist[i];
Else if (l1[i]<t3) return 0.6*m1[i]+0.4*m_hist[i];
Else return 0.5*m1[i]+0.5*m_hist[i];

In some embodiments, the processor 502 can combine the bandwidth value 430 and the confidence value 432 into a single message for transmission to the A/V device 102. For example, the processor 502 can append the confidence value 432 as an additional field in the REMB message containing the bandwidth value 430 within the WebRTC stack. The appended confidence value 432 can indicate how certain the confidence value calculation process 516 is that the bandwidth value 430 within the REMB message is accurate. The combination of the bandwidth value 430 and confidence value 432 can be used to determine a bitrate to assign for each stream of a multi-resolution streaming session.

The server 224 can relay streams received from the A/V device 210 to a target client device 214, 216. In some embodiments, the server 224 can evaluate a connection with a client device 214, 216 and, depending on the channel conditions, the server 224 can relay either the high-resolution stream or the low-resolution stream to the client device 214, 216 (when simultaneously receiving two streams from the A/V device 210). For example, if the connection with the client device 214, 216 is poor, the server 224 can relay the low-resolution stream to the client device 214, 216. The server 224 can evaluate the bandwidth in the same manner as it does with the A/V device 210, or it can follow a different protocol for determining connection quality. The different protocols can include any combination of a WebRTC API, User Datagram Protocol (UDP), real-time transfer protocol (RTP), real-time streaming protocol (RTSP), real-time transport control protocol (RTCP), etc. In some embodiments, the server 224 can take steps to improve the efficiency and/or quality of the streams being relayed. For example, the server 224 can dynamically remove some of the frames from the stream, for example using techniques such as Selective Forwarding Unit (SFU), to improve stream quality at the client device 214, 216. In some embodiments, as connection conditions between the server 224 and the client device 214, 216 change, the server 224 can switch between the high-resolution and low-resolution streams in real-time or near real-time.

FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 614 may store a device application 616. In various embodiments, the device application 616 may configure the processor(s) 602 to receive input(s) to the input interface 604 (e.g., multimedia streams). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the server 224.

With further reference to FIG. 6, the input interface 604 may include a display 618. The display 618 may include a touchscreen, such that the user of the client device 214, 216 may provide inputs directly to the display 618 (e.g., multimedia streams). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

As described herein, at least some of the processes of the A/V device 210, the hub device 202, and/or the server 224 may be executed by the client device 214, 216.

Figure 7:
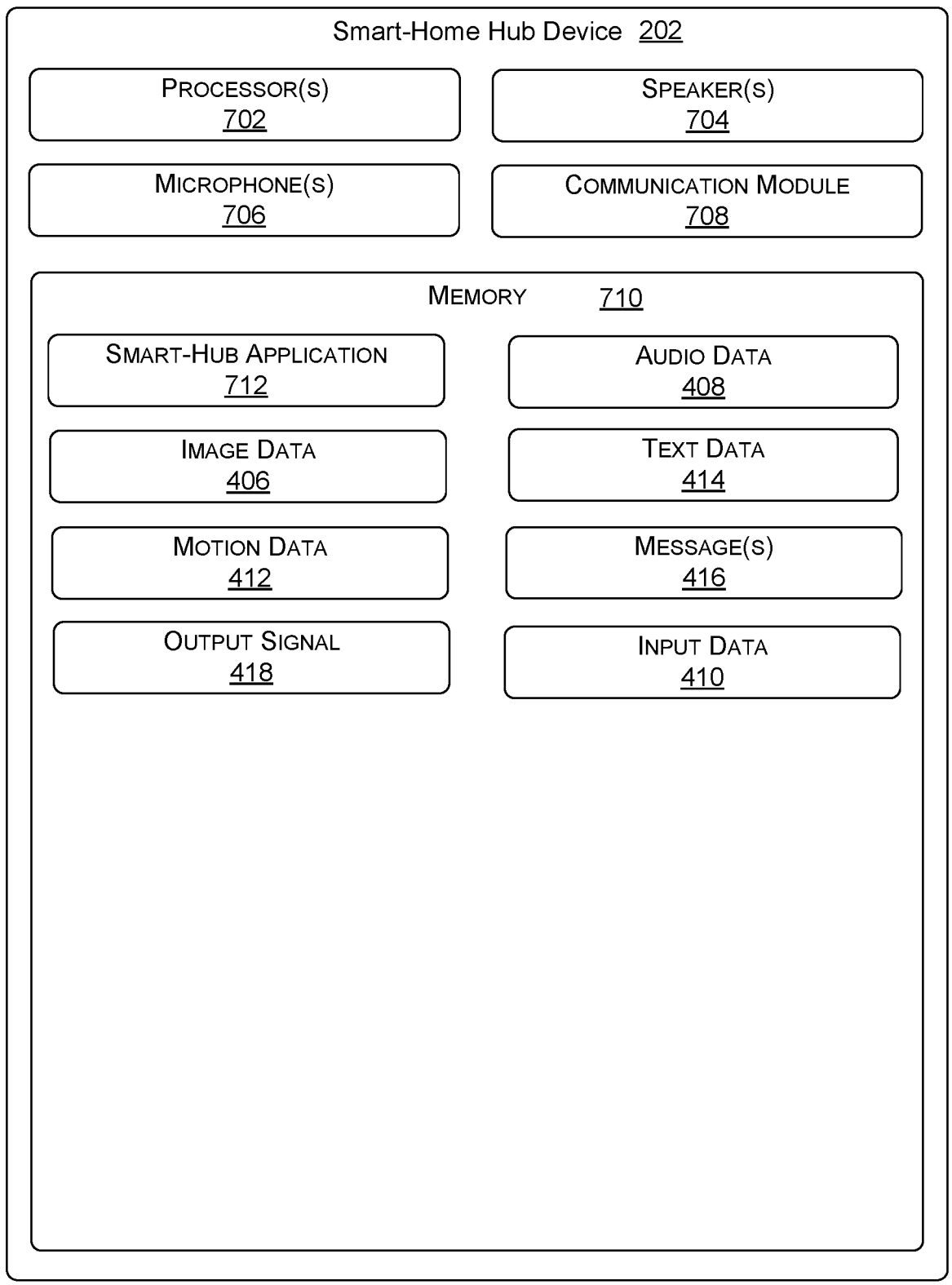
FIG. 7 is a functional block diagram illustrating one example embodiment of a smart-home hub device according to various aspects of the present disclosure.

FIG. 7 is a functional block diagram illustrating an embodiment of the smart-home hub device 202 according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more cameras (not shown). In some embodiments, the hub device 202 may not include one or more of the components shown in FIG. 7, such as the speaker(s) 704 and/or the microphone(s) 706. The hub device 202 and/or the server 224 (and/or one or more additional or alternative components of the network(s) of servers/backend devices 220) may alternatively be referred to herein as "network devices."

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the server 224, and/or an additional electronic device (e.g., a second A/V device 210, the automation device(s) 206, the sensor(s) 204, etc.).

As described herein, at least some of the processes of the A/V device 210, the server 224, and/or the client device 214, 216 may be executed by the hub device 202. In some embodiments, the hub device 202 can performed any processing that can be performed by server 224 processes, as described above with respect to FIG. 5.

Each of the processes described herein, including the processes 800 and 900, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
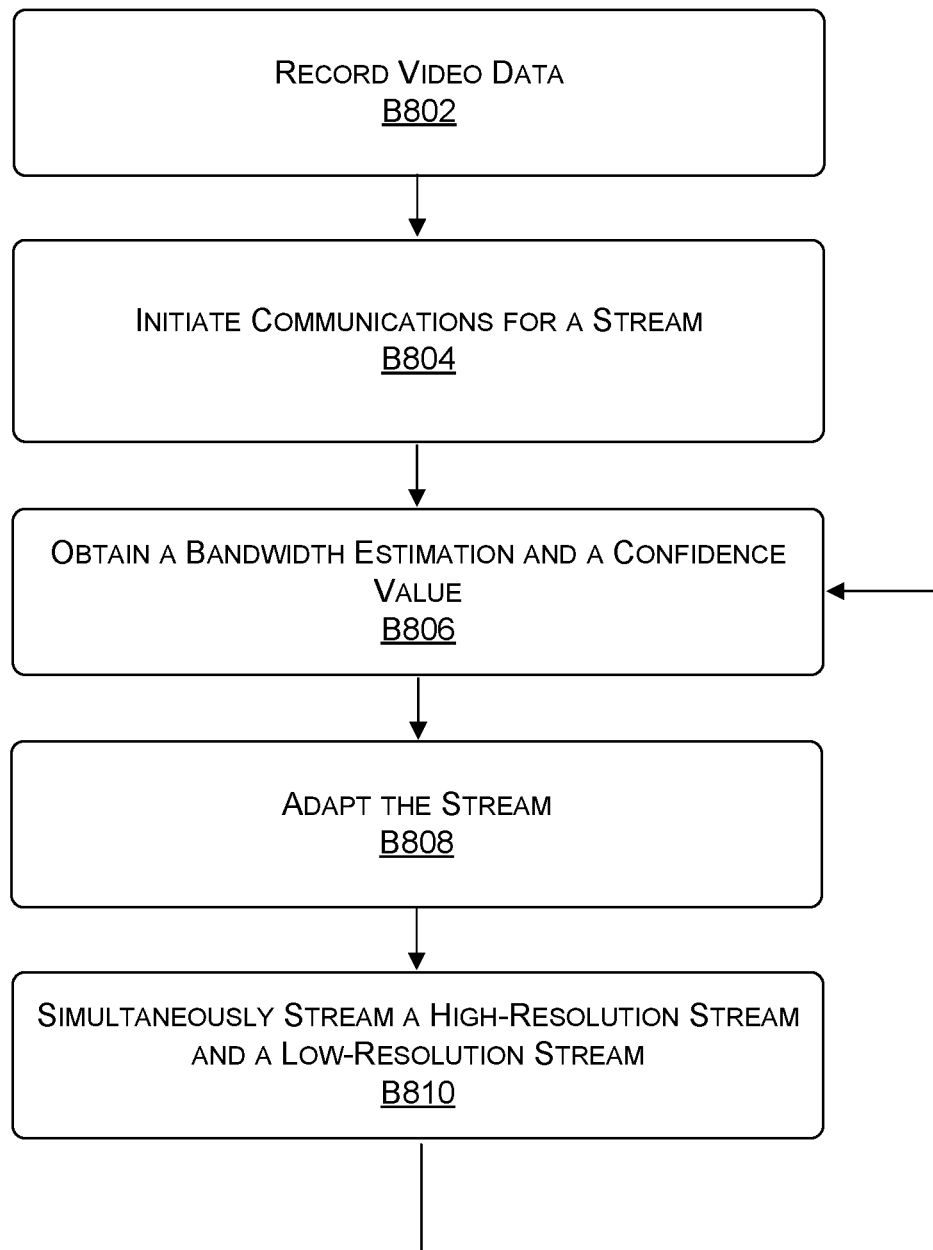
FIG. 8 is a flowchart illustrating an example process for operation of a AV recording and communication device, according to various aspects of the present disclosure.

FIG. 8 is a flowchart illustrating an example process 800 for a device, such as the A/V device 210, to improve a streaming session using multiple simultaneous streams, according to various aspects of the present disclosure. The process 800, or one or more portions thereof, may be performed by an A/V device 210, in some embodiments. In the process 800, at block B802, the camera 314 records audio and/or video data within a predetermined field of view/area of observation. For example, the A/V device 210 may record image data 406 using the camera 314. The recorded image data 406 may represent data recorded within a predetermined area 104 and/or received as an input into the A/V device 210 (e.g., via button 306). As would be appreciated by one skilled in the art, the system 100 and the process 800 can be implemented to record and transmit other data, such as audio data, without departing from the scope of the disclosure invention.

At block B804, the A/V device 210 initiates communications with another device for transmitting streams of the recorded video data. For example, the A/V device 210 can establish a connection with a target device in which it is desired to transmit a stream of the recorded image data 406. The communication can be initiated between the A/V device 210 and the server 224, for example, such as when the A/V device 210 detects a visitor, or when a user at the client device 214, 216 initiates a "live view" streaming session. Communication can be established through any combination of methods, including establishing communication according to a real-time protocol. Once communications have been established, using the stream generation process 420, the A/V device 102 can begin a streaming session that includes streaming the recorded audio and/or video data to the connected device. In some embodiments, during the streaming session, the A/V device 102 simultaneously transmits one high-resolution stream and one low-resolution stream of the recorded audio and/or video data to the connected device with default resolution and frame rate values.

At block B806, the A/V device 210 calculates, receives, and/or otherwise obtains a bandwidth value 430 and a confidence value 432. For example, the A/V device 210 can calculate the bandwidth value 430 and the confidence value 432 based on the bandwidth data 110 and the confidence data 112 received from the server 224. In another example, the A/V device 210 can receive an REMB message 1202, from the server 224, containing field 1208 including the bandwidth value 430 and the confidence value 432 through the real-time communication protocol, for example, as part of the WebRTC stack. The bandwidth value 430 can represent a bandwidth estimation of a total available bandwidth or bitrate that exists between the A/V device 210 and the device receiving the streams. The confidence value 432 can represent a level of certainty that the received bandwidth value 430 is accurate. In some embodiments, the processor 310 can analyze the REMB message to determine whether a field the bandwidth value 430 and the confidence value 432. For example, the processor 310 can search the REMB message for the bandwidth estimation field and extract the bandwidth value from the message for additional processing. For example, the processor 310 can search the REMB message for the additional field and extract the bandwidth value 430 and the confidence value 432 from the message for additional processing. The additional fields can include the bandwidth value 430 and the confidence value 432, which can then be used to match a value or range of values within the scaling table 424.

At block B810, the A/V device 210 adapts the streams in real-time or near real-time based on the received bandwidth estimation and the received confidence value. For example, using a combination of the stream quality database 422, the resolution scaling tables 424, and the stream quality calculation process 426, the A/V device 210 can modify the resolution of the streams within the streaming session. In some embodiments, the processor 310 can retrieve the bandwidth vale and confidence value and compare the values to entries within a scaling table. When a match is confirmed, the processor 310 can retrieve the quality requirements for both a high-resolution stream and a low-resolution stream for generation by the stream generation process. The quality requirements can include any combination of stream resolution, bitrate, frame rate, etc. The stream generation process 420 can determine whether the quality requirements are different than the current streams and adapt the stream accordingly. For example, referring to example TABLE 1 as the scaling table, if the quantitative values for bandwidth value and the confidence value are both medium, then the stream generation process 420 will adapt the high-resolution stream to be 720p resolution at 100 frames per second and the low-resolution stream to be 720p resolution at 15 frames per second (if they were not already). The stream characteristics (e.g., resolution, framerate, bitrate, etc.) can be determined using any combination of methods, for example, any of the methods discussed in greater detail with respect to FIG. 4. As the streaming session continues, the process 800 will redirect back to block B806 and repeat blocks B806-B810 until the streaming session has terminated.

Figure 9:
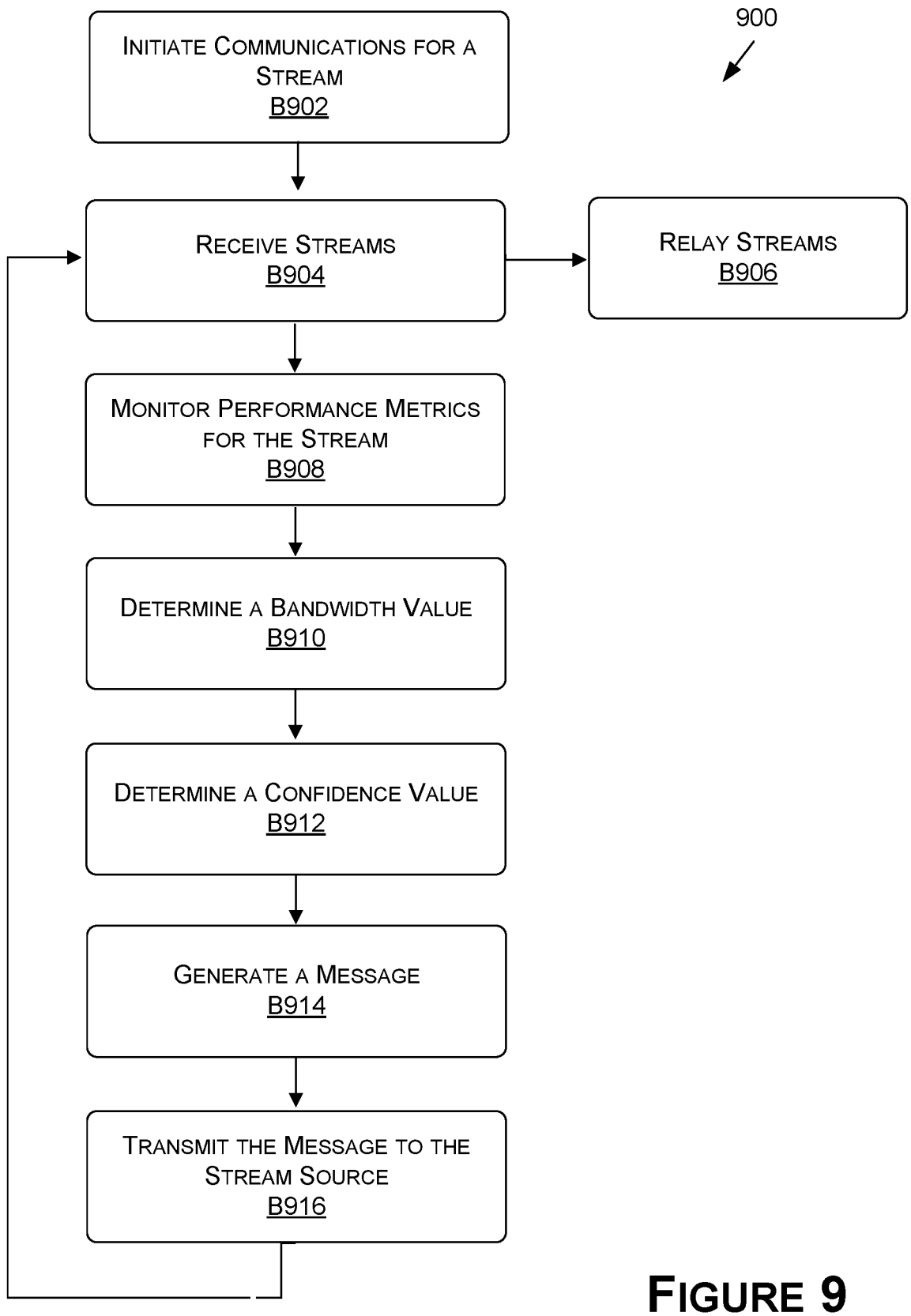
FIG. 9 is a flowchart illustrating an example process for operation of a server, according to various aspects of the present disclosure.

FIG. 9 is a flowchart illustrating an example process 900 for determining resolution for multiple streams being received from another device, according to various aspects of the present disclosure. The process 900, or one or more portions thereof, may be performed by the server 224, in some embodiments. In the process 900, at block B902, the server 224 initiates communications with another device for receiving streams of audio and/or video data. For example, the server 224 can establish a connection with a target device in which it is desired to receive an audio and/or video stream. The communication can be initiated between the server 224 and one of the A/V device 210, the hub device 202, and/or the client device 214, 216. Communication can be established through any combination of means, including establishing communication according to a real-time protocol.

At block B904, the server 224 receives streams from connected devices. For example, using the communication module 502 and once communications have been established, a streaming session can be created and the server 224 can receive streams from the connected device. A streaming session can be created for each unique connection to the server 224 can each streaming session can include multiple simultaneous streams. the backend receives. In some embodiments, during the streaming session, the server 224 simultaneously receives one high-resolution stream and one low-resolution stream of the audio and/or video data recorded by the A/V device 210, with default resolution and frame rate values.

At block B906, the server 224 relays the streams to another device. For example, using the communication module 504, the server 224 can relay/retransmit the streams from the A/V device 210 to one or more client devices 214, 216. In some embodiments, the server 224 can evaluate the connection with the target client devices 214, 216 and select one of the multiple received streams to be transmitted to the client devices 214, 216. For example, using the connection monitoring process 512, if the connection with the client device 214 is excellent, the server 224 can select a high-resolution stream from the streaming session to be transmitted to client device 214, using the communication module 504. Similarly, using the connection monitoring process 512, if the connection with the client device 216 is poor, the server 224 can select a low-resolution stream from the streaming session to be transmitted to client device 216, using the communication module 504.

At block B908, the server 224 monitors the performance metrics for the active the streaming sessions (for each streaming device) with A/V devices. For example, using the connection monitoring process 512, the server 224 can monitor various performance metrics for each of the received streaming sessions.

At block B910, the server 224 estimates a total available bandwidth between the server and the device transmitting the streaming session. For example, using the bandwidth value calculation process 514, the server 224 can calculate an estimated bandwidth between itself and the A/V device 210 streaming audio and/or video data. The calculated bandwidth estimate can be saved as the bandwidth value 430 for transmission to the A/V device 210 for additional processing. In some embodiments, the bandwidth value 430 is included in a BR exp and BR Mantissa fields within an REMB message 1202. In other embodiments, the bandwidth value 430 is included in any available field(s) within an REMB message 1200 by leveraging any unused bits in those field(s).

At block B912, the server 224 determines a confidence value for the total available bandwidth estimate. For example, using the confidence value calculation process 516, the server 224 can calculate a confidence value 432 for the bandwidth value 430 calculated in block B910. The confidence value 432 can be generated using any combination of methods, for example, the methods discussed in greater detail with respect to FIG. 5. The confidence value 432 can be saved and appended to the message (e.g., message 1202) including the bandwidth value 430. In some embodiments, the confidence value 432 is included in a confidence value field 1208 within an REMB message 1202. In other embodiments, the confidence value 432 is included in any available field(s) within an REMB message 1200 by leveraging any unused bits in those field(s). In some embodiments, the A/V device 210 may perform one or more of steps B908-B912, instead of the server 224, based on the bandwidth data 110 and/or the confidence data 112 provided to the A/V device 210 by the server 224.

At block B914, the server 224 generates a message (e.g., an REMB message 1202) including the bandwidth value 430 and the confidence value 432. For example, the processor 502 can generate the REMB message 1202 including both the bandwidth value 430 and the confidence value 432 in a format that can be readable and interpreted by the A/V device 210.

At block B916, the server 224 transmits the message to the transmitting device to adapt the stream quality. For example, using the communication module 502, the server 224 can transmit the REMB message including both bandwidth value 430 and the confidence value 432 to the A/V device 210 for use in determining resolutions of the streams in the streaming session, as discussed in greater detail with respect to FIG. 8. As the duration of the streaming session continues, the process 900 will redirect back to block B904 and repeat blocks B904-B916 until the streaming session has terminated.

In a first aspect, a method for a camera device, the camera device including a camera, a processor, and a communication module is provided. The method involves recording, with the camera, video image data and receiving, from a network device, a bandwidth estimation for a streaming session between the camera device and the network device. The method also involves receiving, from the network device, a confidence value for the bandwidth estimation and generating, by the processor, a first video stream from the video image data, the first video stream having a first resolution selected based on the bandwidth estimation and the confidence value. The method further involves generating, by the processor, a second video stream from the video image data, the second video stream having a second resolution selected based on the bandwidth estimation and the confidence value and simultaneously transmitting, with the communication module, the first video stream and the second video stream to the network device.

In an embodiment of the first aspect, the bandwidth estimation is a receiver estimated maximum bitrate (REMB) message and receiving the confidence value involves receiving the REMB message with a field including the confidence value.

In an embodiment of the first aspect, generating the first video stream involves generating a high-resolution stream having the first resolution, a first frame rate, and a first bitrate and generating the second video stream comprises generating a low-resolution stream having the second resolution, a second frame rate, and a second bitrate. In this embodiment, determining the first bitrate and the second bitrate are based on thresholds defined in at least one of a scaling table, a bitrate matrix, database entries, an index, and a lookup table.

In an embodiment of the first aspect, the confidence value represents a level of likelihood that the bandwidth estimation is accurate.

In an embodiment of the first aspect, the method further involves receiving, from the network device, a periodic message including a re-determined estimated bandwidth value and an updated confidence value. In this embodiment, the method further involves updating, by the processor based on the periodic message, the first video stream and the second video stream from the video image data, the second video stream having a second resolution selected based on the re-determined estimated bandwidth value and the updated confidence value.

In a first aspect, a method is provided. The method involves monitoring at least one performance metric for a streaming session with a camera device, estimating, based on the at least one performance metric, an estimated bandwidth value for the streaming session with the camera device, and determining a confidence value for the estimated bandwidth value. The method also involves generating a message including the estimated bandwidth value and the confidence value, transmitting the message including the estimated bandwidth value and the confidence value to the camera device, and simultaneously receiving, from the camera device, a first stream at a first resolution and a second stream at a second resolution, the first resolution and the second resolution based on the estimated bandwidth value and the confidence value.

In an embodiment of the first aspect, the confidence value represents a level of likelihood that the bandwidth estimation is accurate.

In an embodiment of the first aspect, determining the confidence value for the estimated bandwidth value comprises calculating a weighted average based on a mathematical second moment of the estimated bandwidth value, a mathematical second moment of packet arrival delays, and a length of the streaming session with the camera device.

In an embodiment of the first aspect, the at least one performance metric(s) include at least one of packet arrival delays, jitter, number of retries, and packet losses.

In an embodiment of the first aspect, the method further involves continuing to monitor the at least one performance metric for the streaming session with the camera device and periodically re-estimating, based on the at least one performance metric, a re-estimated bandwidth value, determining an updated confidence value for the re-estimated bandwidth value, and generating and transmitting, to the camera device, a periodic message including the re-estimated bandwidth value and the updated confidence value.

In an embodiment of the first aspect, the message including the estimated bandwidth value and the confidence value comprises a receiver estimated maximum bitrate (REMB) message having a field including the confidence value.

In a first aspect, a method for a network device is provided. The method involves monitoring at least one performance metric for a streaming session with a camera device and estimating, based on the at least one performance metric, an estimated bandwidth value for the streaming session with the camera device. The method also involves determining a confidence value for the estimated bandwidth value, including calculating a weighted average based on a mathematical second moment of the estimated bandwidth value, a mathematical second moment of packet arrival delays, and a length of the streaming session with the camera device and generating a message including the estimated bandwidth value and the confidence value; and transmitting the message including the estimated bandwidth value and the confidence value to the camera device.

In an embodiment of the first aspect, the confidence value represents a level of likelihood that the bandwidth estimation is accurate.

In an embodiment of the first aspect, the at least one performance metric(s) include at least one of packet arrival delays, jitter, number of retries, and packet losses.

In an embodiment of the first aspect, the method further involves continuing to monitor the at least one performance metric for the streaming session with the camera device and periodically re-estimating, based on the at least one performance metric, a re-estimated bandwidth value, determining an updated confidence value for the re-estimated bandwidth value, and generating and transmitting, to the camera device, a periodic message including the re-estimated bandwidth value and the updated confidence value.

In an embodiment of the first aspect, the message including the estimated bandwidth value and the confidence value comprises a receiver estimated maximum bitrate (REMB) message having a field including the confidence value.

Figure 10:
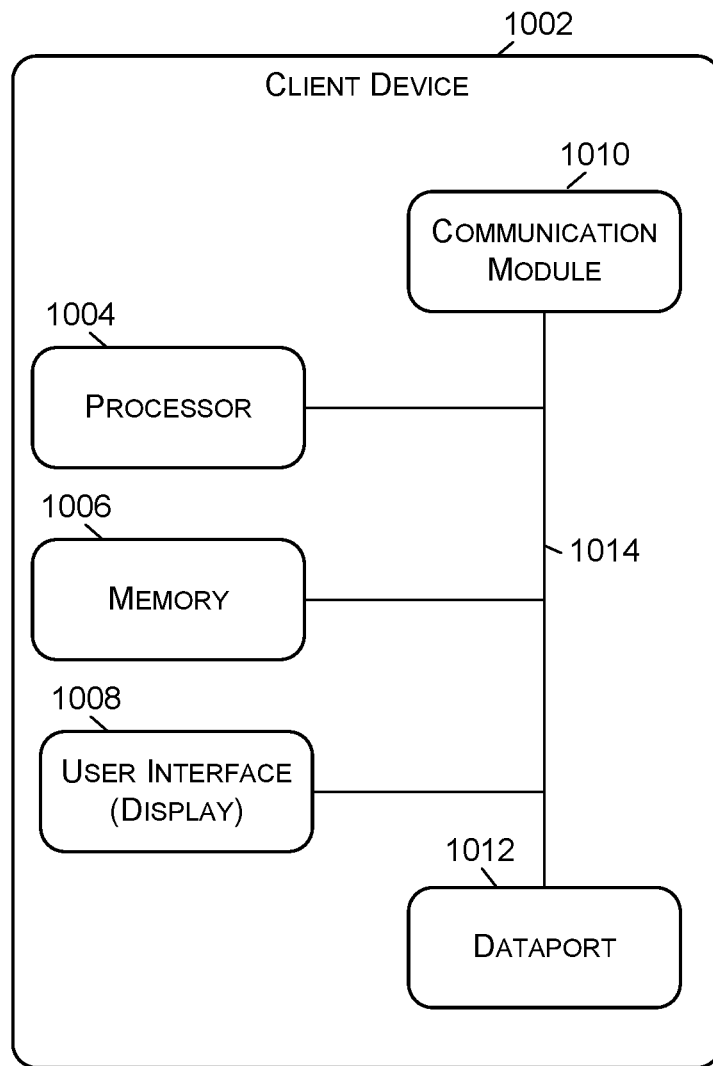
FIG. 10 is a functional block diagram of a client device on which the present embodiments may be implemented according to various aspects of the present disclosure.

FIG. 10 is a functional block diagram of a client device 1002 on which the present embodiments may be implemented according to various aspects of the present disclosure. The client device(s) 214, 216 described with reference to FIG. 2 may include some or all of the components and/or functionality of the client device 1002. The client device 1002 may comprise, for example, a smartphone.

With reference to FIG. 10, the client device 1002 includes a processor 1004, a memory 1006, a user interface 1008, a communication module 1010, and a dataport 1012. These components are communicatively coupled together by an interconnect bus 1014. The processor 1004 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1006 may include both operating memory, such as random-access memory (RAM), as well as data storage, such as read-only memory (ROM), hard drives, flash memory, or any other suitable memory/storage element. The memory 1006 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1004 and the memory 1006 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1004 may be connected to the memory 1006 via the dataport 1012.

The user interface 1008 may include any user interface or presentation elements suitable for a smartphone and/or a portable computing device, such as a keypad, a display screen, a touchscreen, a microphone, and a speaker. The communication module 1010 is configured to handle communication links between the client device 1002 and other, external devices or receivers, and to route incoming/outgoing data appropriately. For example, inbound data from the dataport 1012 may be routed through the communication module 1010 before being directed to the processor 1004, and outbound data from the processor 1004 may be routed through the communication module 1010 before being directed to the dataport 1012. The communication module 1010 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1012 may be any type of connector used for physically interfacing with a smartphone and/or a portable computing device, such as a mini-USB port or an IPHONE®/IPOD® 30-pin connector or LIGHTNING® connector. In other embodiments, the dataport 1012 may include multiple communication channels for simultaneous communication with, for example, other processors, servers, and/or client terminals.

The memory 1006 may store instructions for communicating with other systems, such as a computer. The memory 1006 may store, for example, a program (e.g., computer program code) adapted to direct the processor 1004 in accordance with the present embodiments. The instructions also may include program elements, such as an operating system. While execution of sequences of instructions in the program causes the processor 1004 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 11:
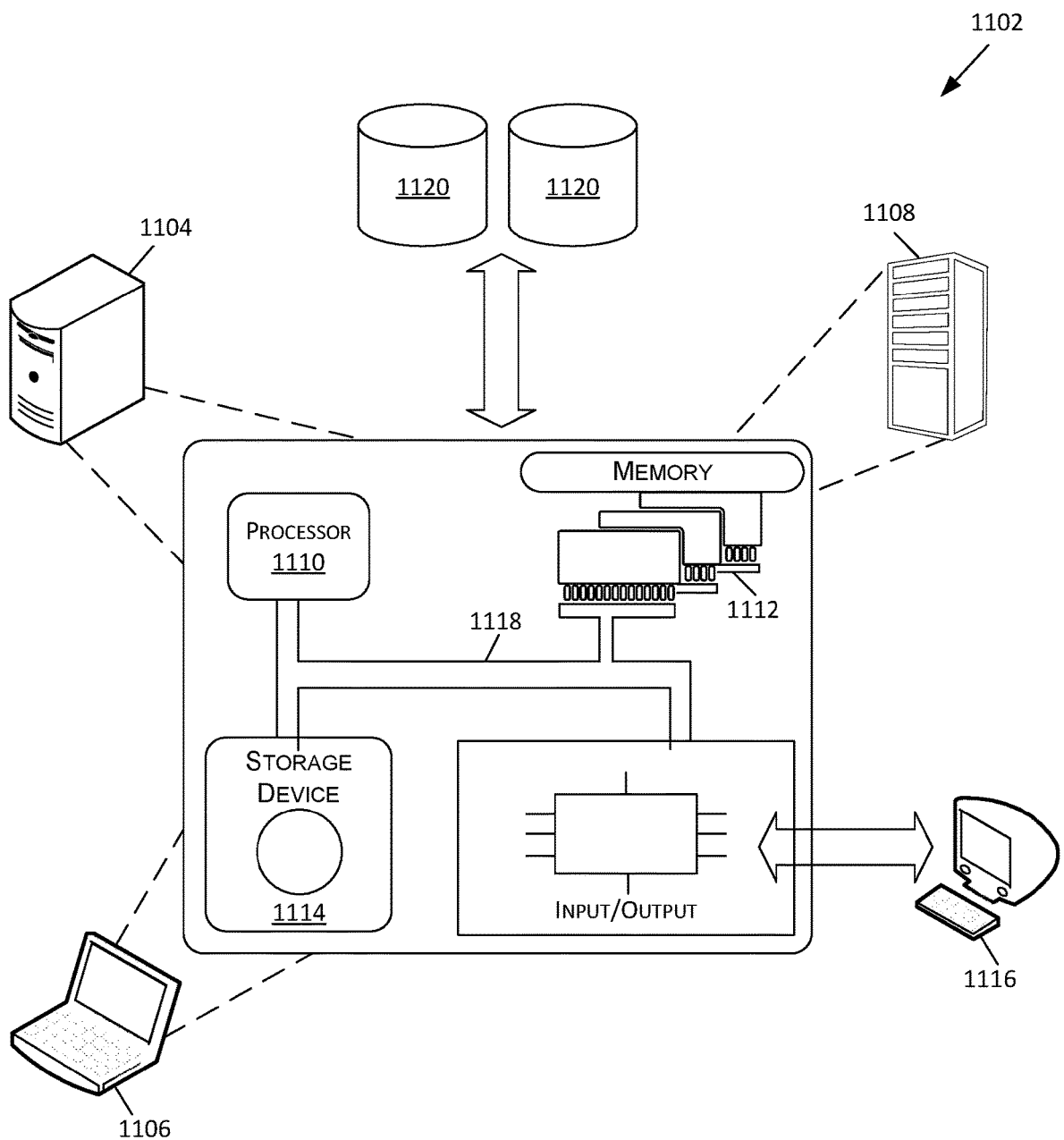
FIG. 11 is a functional block diagram of a general-purpose computing system on which the present embodiments may be implemented according to various aspects of present disclosure.

FIG. 11 is a functional block diagram of a general-purpose computing system on which the present embodiments may be implemented according to various aspects of the present disclosure. The computer system 1102 may be embodied in at least one of a personal computer (also referred to as a desktop computer) 1104, a portable computer (also referred to as a laptop or notebook computer) 1106, and/or a server 1108 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1102 may execute at least some of the operations described above. The computer system 1102 may include at least one processor 1110, memory 1112, at least one storage device 1114, and input/output (I/O) devices 1116. Some or all of the components 1110, 1112, 1114, 1116 may be interconnected via a system bus 1118. The processor 1110 may be single- or multi-threaded and may have one or more cores. The processor 1110 execute instructions, such as those stored in the memory 1112 and/or in the storage device 1114. Information may be received and output using one or more I/O devices 1116.

The memory 1112 may store information, and may be a computer-readable medium, such as volatile or non-volatile memory. The storage device(s) 1114 may provide storage for the system 1102 and, in some embodiments, may be a computer-readable medium. In various aspects, the storage device(s) 1114 may be a flash memory device, a hard disk device, an optical disk device, a tape device, or any other type of storage device.

The I/O devices 1116 may provide input/output operations for the system 1102. The I/O devices 1116 may include a keyboard, a pointing device, and/or a microphone. The I/O devices 1116 may further include a display unit for displaying graphical user interfaces, a speaker, and/or a printer. External data may be stored in one or more accessible external databases 1120.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present disclosure is not limited to the particular embodiments disclosed. On the contrary, the present disclosure covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising
communicating, from a network device to a camera device,
a bandwidth estimation for a streaming session from the camera device, and
a confidence value representing a level of certainty that the bandwidth estimation is accurate;
receiving, at the network device from the camera device,
data for a first video stream based on video recorded by the camera device, the first video stream having a first resolution selected based on the bandwidth estimation and the confidence value, and
data for a second video stream based on video recorded by the camera device, the second video stream having a second resolution selected based on the bandwidth estimation and the confidence value, wherein a bandwidth, based on the bandwidth estimation, is divided between the first video stream and the second video stream; and
communicating, from the network device to a client device, data for the first video stream or the second video stream.

2. The method of claim 1, wherein the bandwidth estimation comprises a receiver estimated maximum bitrate (REMB) message and communicating the confidence value comprises providing the REMB message with a field that includes the confidence value.

3. The method of claim 1, wherein the first video stream comprises a high-resolution video data stream having the first resolution, a first frame rate, and a first bitrate, and the second video stream comprises a low-resolution video data stream having the second resolution, a second frame rate, and a second bitrate.

4. The method of claim 3, wherein at least one of the first bitrate or the second bitrate are determined based on thresholds defined in at least one of a scaling table, a bitrate matrix, database entries, an index, and a lookup table.

5. The method of claim 1, further comprising communicating, from the network device to the camera device at periodic intervals, a re-determined estimated bandwidth value and an updated confidence value.

6. The method of claim 1, wherein the confidence value is determined based on data collected in relation to the streaming session and a duration of the streaming session.

7. The method of claim 6, wherein data collected in relation to the streaming session comprises data collected during a moving window of time.

8. The method of claim 1, wherein the at least one of the first video stream or the second video stream communicated to the client device is determined based on a second bandwidth of a communication session established between the network device and the client device.

9. The method of claim 1, wherein the bandwidth estimation is of a total available bandwidth or bitrate that exists between the camera and the network device.

10. A camera device comprising
a camera;
a processor;
a communication module; and
one or more computer readable media containing computer executable instructions for performing a method comprising:
recording, with the camera, video image data,
receiving, from a network device,
a bandwidth estimation for a streaming session from the camera device, and
a confidence value representing a level of certainty that the bandwidth estimation is accurate;
generating, by the processor, a first video stream from the video image data, the first video stream having a first resolution selected based on the bandwidth estimation and the confidence value,
generating, by the processor, a second video stream from the video image data, the second video stream having a second resolution selected based on the bandwidth estimation and the confidence value, and
communicating data for the first video stream and the second video stream to the network device.

11. The camera device of claim 10, wherein a bandwidth, based on the bandwidth estimation, is divided between the first video stream and the second video stream.

12. The camera device of claim 10, wherein at least one of the first resolution or second resolution is selected based on a resolution scaling table.

13. The camera device of claim 10, wherein the bandwidth estimation is determined based at least on one of packet arrival delays, jitter, number of retries, or packet losses.

14. The camera device of claim 10, wherein the first video stream further has a framerate or bitrate selected based on the bandwidth estimation and the confidence value.

15. The camera device of claim 10, further comprising:
receiving, from the network device, an updated bandwidth estimation and an updated confidence value;
generating, by the processor, an updated first video stream from the video image data; and
communicating the updated first video stream to the network device.

16. The camera device of claim 10, wherein the bandwidth estimation comprises a receiver estimated maximum bitrate (REMB) message and receiving the confidence value comprises receiving the REMB message with a field that includes the confidence value.

17. A network device comprising:
one or more processors; and
one or more computer-readable media storing instructions that, when executed by the one or more processors, cause the network device to perform operations comprising:
communicating, to a camera device,
a bandwidth estimation for a streaming session from the camera device, and
a confidence value representing a level of certainty that the bandwidth estimation is accurate;
receiving, from the camera device,
data for a first video stream based on video recorded by the camera device, the first video stream having a first resolution selected based on the bandwidth estimation and the confidence value, and
data for a second video stream based on video recorded by the camera device, the second video stream having a second resolution selected based on the bandwidth estimation and the confidence value, wherein a bandwidth, based on the bandwidth estimation, is divided between the first video stream and the second video stream; and
communicating, to a client device, data for the first video stream or the second video stream.

18. The network device of claim 17, further comprising periodically calculating an updated bandwidth estimation and an updated confidence value and communicating the updated bandwidth estimation and the updated confidence value to the camera device.

19. The network device of claim 17, wherein a selection of one of the first video stream or the second video stream is communicated to the client device based on a bandwidth of a communication session between the network device and the client device.

20. The network device of claim 17, wherein the confidence value is determined based on calculating a weighted average based on a mathematical second moment of the estimated bandwidth value, a mathematical second moment of packet arrival delays, and a length of the streaming session with the camera device.

* * * * *